(12) United States Patent
Black et al.

(10) Patent No.: US 10,063,101 B2
(45) Date of Patent: Aug. 28, 2018

(54) WIRELESS POWER TRANSFER USING TUNABLE METAMATERIAL SYSTEMS AND METHODS

(71) Applicant: Elwha LLC, Bellevue, WA (US)

(72) Inventors: Eric J. Black, Bothell, WA (US); Brian Mark Deutsch, Snoqualmie, WA (US); Alexander Remley Katko, Bellevue, WA (US); Melroy Machado, Seattle, WA (US); Jay Howard McCandless, Alpine, CA (US); Yaroslav A. Urzhumov, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 424 days.

(21) Appl. No.: 14/986,255

(22) Filed: Dec. 31, 2015

(65) Prior Publication Data

US 2017/0069969 A1    Mar. 9, 2017

Related U.S. Application Data

(63) Continuation-in-part of application No. 14/918,331, filed on Oct. 20, 2015.
(Continued)

(51) Int. Cl.
*H02J 50/12* (2016.01)
*H01Q 3/36* (2006.01)
(Continued)

(52) U.S. Cl.
CPC ............ *H02J 50/12* (2016.02); *H01Q 3/36* (2013.01); *H02J 50/90* (2016.02); *H01Q 15/0086* (2013.01)

(58) Field of Classification Search
CPC ....................................... H01Q 3/36
See application file for complete search history.

(56) References Cited

U.S. PATENT DOCUMENTS 6,492,942 B1   12/2002   Kezys
7,256,753 B2   8/2007   Werner et al.
(Continued)

OTHER PUBLICATIONS

Zhang, Tong, Minfan Fu, Chengbin Ma, and Xinen Zhu. "Optimal load analysis for a two-receiver wireless power transfer system." in Wireless Power Transfer Conference (WPTC), 2014 IEEE, pp. 84-87. IEEE, 2014.*
(Continued)

*Primary Examiner* — Daniel Cavallari

(57) ABSTRACT

The present disclosure provides system and methods for optimizing the tuning of impedance elements associate with sub-wavelength antenna elements to attain target radiation and/or field patterns. A scattering matrix (S-Matrix) of field amplitudes for each of a plurality of modeled lumped ports, N, may be determined that includes a plurality of lumped antenna ports, $N_a$, with impedance values corresponding to the impedance values of associated impedance elements and at least one modeled external port, $N_e$, located external to the antenna system at a specified radius vector. Impedance values may be identified through an optimization process, and the impedance elements may be tuned (dynamically or statically) to attain a specific target radiation pattern.

38 Claims, 26 Drawing Sheets

Related U.S. Application Data

(60) Provisional application No. 62/214,836, filed on Sep. 4, 2015.

(51) Int. Cl.
*H02J 50/90* (2016.01)
*H01Q 15/00* (2006.01)

(56) References Cited

U.S. PATENT DOCUMENTS

| | | |
|---|---|---|
| 8,471,776 B2 | 6/2013 | Das |
| 8,776,002 B2 | 7/2014 | Formato |
| 2003/0048223 A1 | 3/2003 | Kezys |
| 2010/0136926 A1 | 6/2010 | Lackey |
| 2011/0260920 A1 | 10/2011 | Dybdal et al. |
| 2014/0056378 A1 | 2/2014 | Harel et al. |
| 2014/0340278 A1 | 11/2014 | Formato |
| 2017/0356980 A1 | 12/2017 | Islam et al. |

OTHER PUBLICATIONS

Driscoll et al., Performance of a three dimensional transformation-optical-flattened Luneburg lens, Optics Express, Jun. 4, 2012, vol. 20 No. 12, Optical Society of America.
Larouche et al., Nanotube holograms, Nature, Nov. 1, 2012, pp. 47-48, vol. 491, Macmillan Publishers Limited.
Landy et al., A full-parameter unidirectional metamaterial cloak for microwaves, Nature Materials, Nov. 11, 2012, pp. 1-4, Macmillan Publishers Limited.
Hunt et al., Broadband Wide Angle Lens Implemented with Dielectric Metamaterials, www.mdpi.com/journal/sensors, Aug. 12, 2011, pp. 7982-7991.
Larouche et al., Infrared metamaterial phase holograms, Nature Materials, Mar. 18, 2012, pp. 450-454, vol. 11.
Hunt et al., Planar, flattened Luneburg lens at infrared wavelengths, Optics Express, Jan. 16, 2012, pp. 1706-1713, vol. 20 No. 2, Optical Society of America.
Urzhumov et al., Thin low-loss dielectric coatings for free-space cloaking, Optics Letters, May 15, 2013, pp. 1606-1608, vol. 38 No. 10, Optical Society of America.
Urzhumov et al., Low-loss directional cloaks without superluminal velocity or magnetic response, Optics Letters, Nov. 1, 2012, pp. 4471-4473, vol. 37 No. 21, Optical Society of America.
Ni et al., Metasurface holograms for visible light, Nature Communications, Nov. 15, 2013, pp. 1-6, Macmillan Publishers Limited.
Leon-Saval et al., Mode-selective photonic lanterns for space-division multiplexing, Optics Express, Jan. 13, 2014, pp. 1-9, vol. 22 No. 1, Optical Society of America.
Lalau-Keraly et al., Adjoint shape optimization applied to electromagnetic design, Optics Express, Sep. 9, 2013, pp. 21693-21701, vol. 21 No. 18, Optical Society of America.
Lin et al., Nanostructured Holograms for Broadband Manipulation of Vector Beams, Nano Letters, Aug. 5, 2013, pp. 4269-4274, American Chemical Society.
Jin et al., Advances in Particle Swarm Optimization for Antenna Designs: Real-Number, Binary, Single-Objective and Multiobjective Implementations, IEEE Transactions on Antennas and Propagation, Mar. 2007, pp. 556-567, vol. 55 No. 3, IEEE.
Zhu et al., Design and Optimization of Low Rcs Patch Antennas Based on a Genetic Algorithm, Progress in Electromagnetics Research, 2012, pp. 327-339, vol. 122.
Wu et al., Design Synthesis of Metasurfaces for Broadband Hybrid-Mode Horn Antennas With Enhanced Radiation Pattern and Polarization Characteristics, IEEE Transactions on Antennas and Propagation, Aug. 2012, pp. 3594-3604, vol. 60 No. 8, IEEE.
Boeringer et al., Efficiency-Constrained Particle Swarm Optimization of a Modified Bernstein Polynomial for Conformal Array Excitation Amplitude Synthesis, IEEE Transactions on Antennas and Propagation, Aug. 2005, pp. 2662-2673, vol. 53 No. 8, IEEE.
Yu et al., Flat optics with designer metasurfaces, Nature Materials, Jan. 23, 2014, pp. 139-150, vol. 13, Macmillan Publishers Limited.
Jensen et al., Topology optimization for nano-photonics, Laser Photonics, 2011, pp. 308-321, Rev 5 No. 2, Wiley-Vhe Verleg GmbH & Co.
Orihara et al., Optimization and application of hybrid-level binary zone plates, Applied Optics, Nov. 10, 2001, pp. 5877-5885, vol. 40 No. 32, Optical Society of America.
Seliger et al., Optimization of aperiodic dielectric structures, http://dx.doi.org/10.1063/1.2221497, Aug. 8, 2006, visited Aug. 11, 2014.
Toader et al., Photonic Band Gap Architectures for Holographic Lithography, Physical Review Letters, Jan. 30, 2004, pp. 1-4, vol. 92 No. 4, The American Physical Society.
Sharp et al., Photonic crystals for the visible spectrum by holographic lithography, Optical and Quantum Electronics 34, 2002, pp. 3-12, Kluwer Academic Publishers.
Fong et al., Scalar and Tensor Holographic Artificial Impedance Surfaces, IEEE Transactions on Antennas and Propagation, Oct. 2010, pp. 3212-3221, vol. 58 No. 10, IEEE.
Kildishev et al., Planar Photonics with Metasurfaces, Science 339, http://www.sciencemag.org/content/339/6125/1232009.full.html, Mar. 15, 2013, visited Oct. 8, 2014.
Saravanamuttu et al., Sol-Gel Organic-Inorganic Composites for 3-D Holographic Lithography of Photonic Crystals with Submicron Periodicity, American Chemical Society, Apr. 29, 2003, 4 pgs.
Bayraktar et al., The Design of Miniature Three-Element Stochastic Yagi-Uda Arrays Using Particle Swarm Optimization, IEEE Antennas and Wireless Propagation Letters, Nov. 22, 2005, pp. 22-26, IEEE.
Miller, Photonic Design: From Fundamental Solar Cell Physics to Computational Inverse Design, Thesis, Spring 2012, pp. 137.
Huang et al., Three-dimensional optical holography using a plasmonic metasurface, Nature Communications, Nov. 15, 2013, pp. 1-8, Macmillan Publishers Limited.
Yu et al., Topology optimization for highly-efficient light-trapping structure in solar cells, Research paper, May 10, 2014, pp. 367-382, Springer-Verlag Berlin Heidelberg 2014.
PCT International Search Report; International App. No. PCT/US2016/049965; Dec. 8, 2016; pp. 1-3.
Zhang et al.; "Optimal Load Analysis for a Two-Receiver Wireless Power Transfer System"; Wireless Power Transfer Conference (WPTC), 2014 IEEE 2014; pp. 84-87.

\* cited by examiner

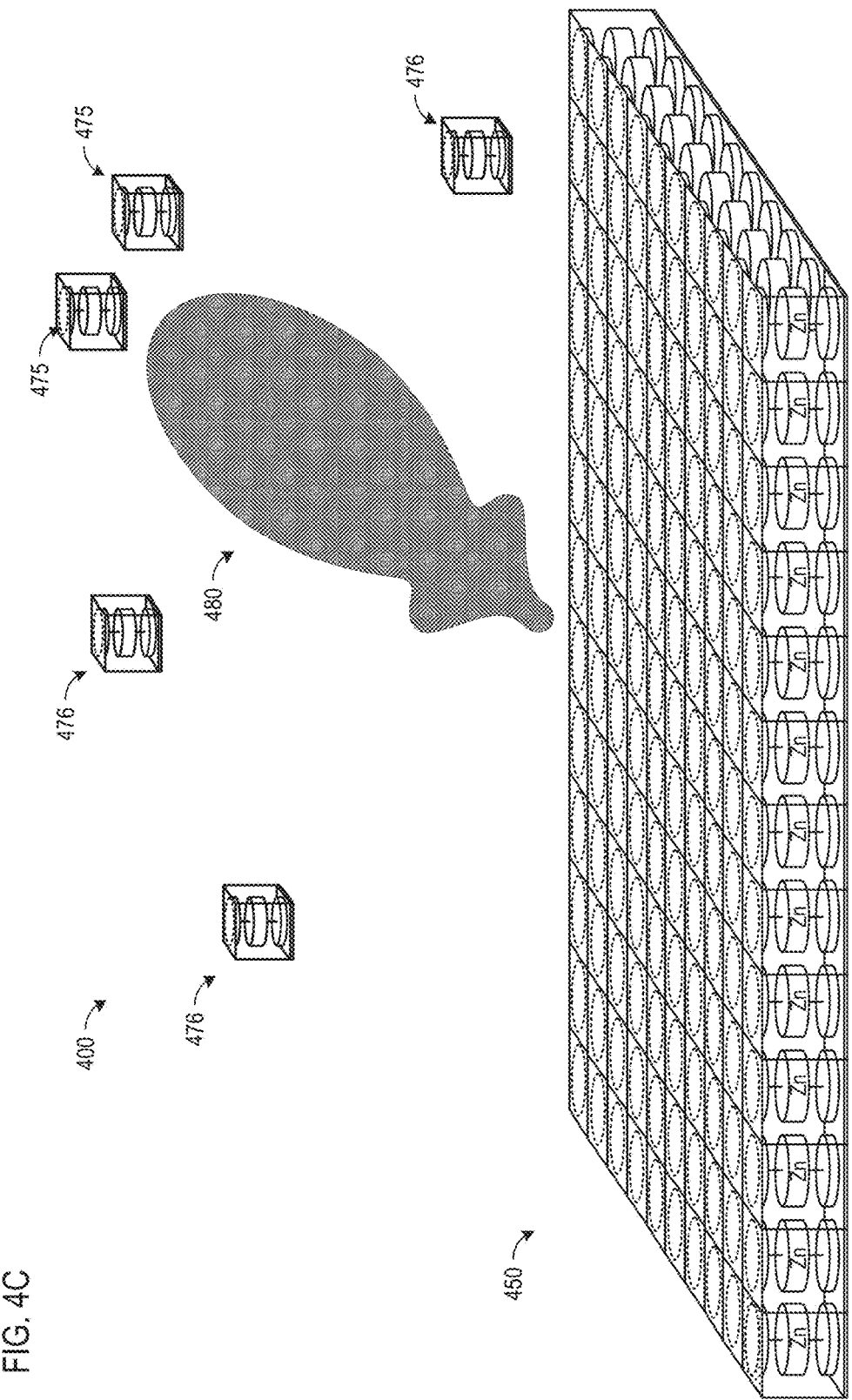

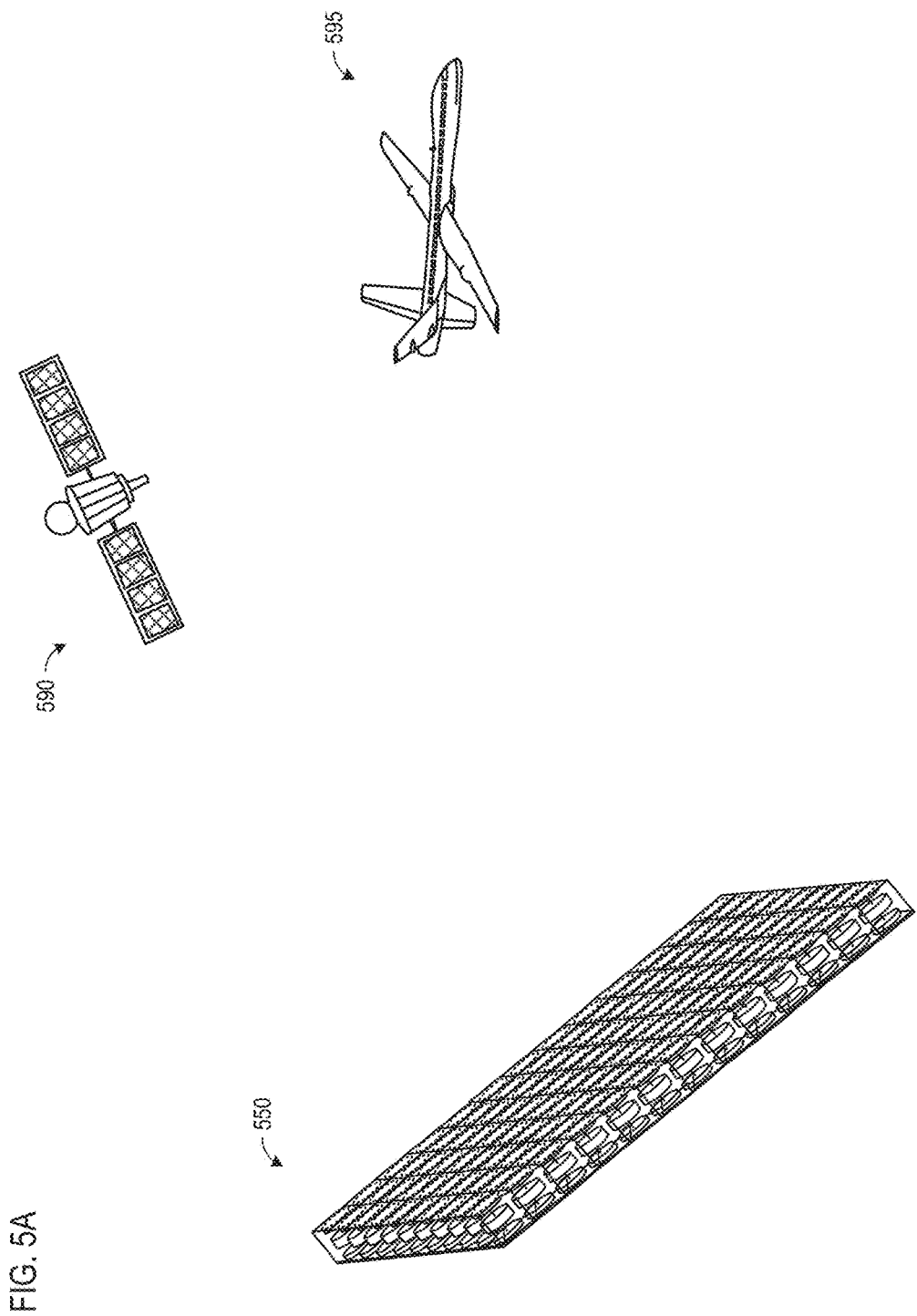

WIRELESS POWER TRANSFER USING TUNABLE METAMATERIAL SYSTEMS AND METHODS

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc., applications of the Priority Application(s)). In addition, the present application is related to the "Related Applications," if any, listed below.

Priority Applications

This application claims priority under 35 U.S.C. § 119(e) to Provisional Patent App. No. 62/214,836, filed on Sep. 4, 2015, titled "Tunable Metamaterial Devices and Methods for Selecting Global Optima in Their Performance," which application is hereby incorporated by reference in its entirety. This application is also a Continuation-in-part of U.S. patent application Ser. No. 14/918,331, filed on Oct. 20, 2015, titled "Tunable Metamaterial Systems and Methods," which application is also incorporated by reference it its entirety.

If an Application Data Sheet (ADS) has been filed on the filing date of this application, it is incorporated by reference herein. Any applications claimed in the ADS for priority under 35 U.S.C. §§ 119, 120, 121, or 365(c), and any and all parent, grandparent, great-grandparent, etc., applications of such applications are also incorporated by reference, including any priority claims made in those applications and any material incorporated by reference, to the extent such subject matter is not inconsistent herewith.

Related Applications

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

This disclosure relates to wireless power transfer utilizing tunable metamaterial devices and the optimization of variable impedance elements associated therewith to attain target radiation and/or field patterns.

BRIEF DESCRIPTION OF THE DRAWINGS

FIG. 4C illustrates a radiation pattern formed to maximize a field amplitude of S-Matrix elements associated with two external ports, $N_e$, located physically external to the antenna system and by minimizing the field amplitude of three other external ports $N_e$, according to one embodiment.

FIG. 5A illustrates an antenna system comprising an array of sub-wavelength antenna elements and associated variable impedance elements with two intended targets for radiation patterning.

DETAILED DESCRIPTION

Figure 1:
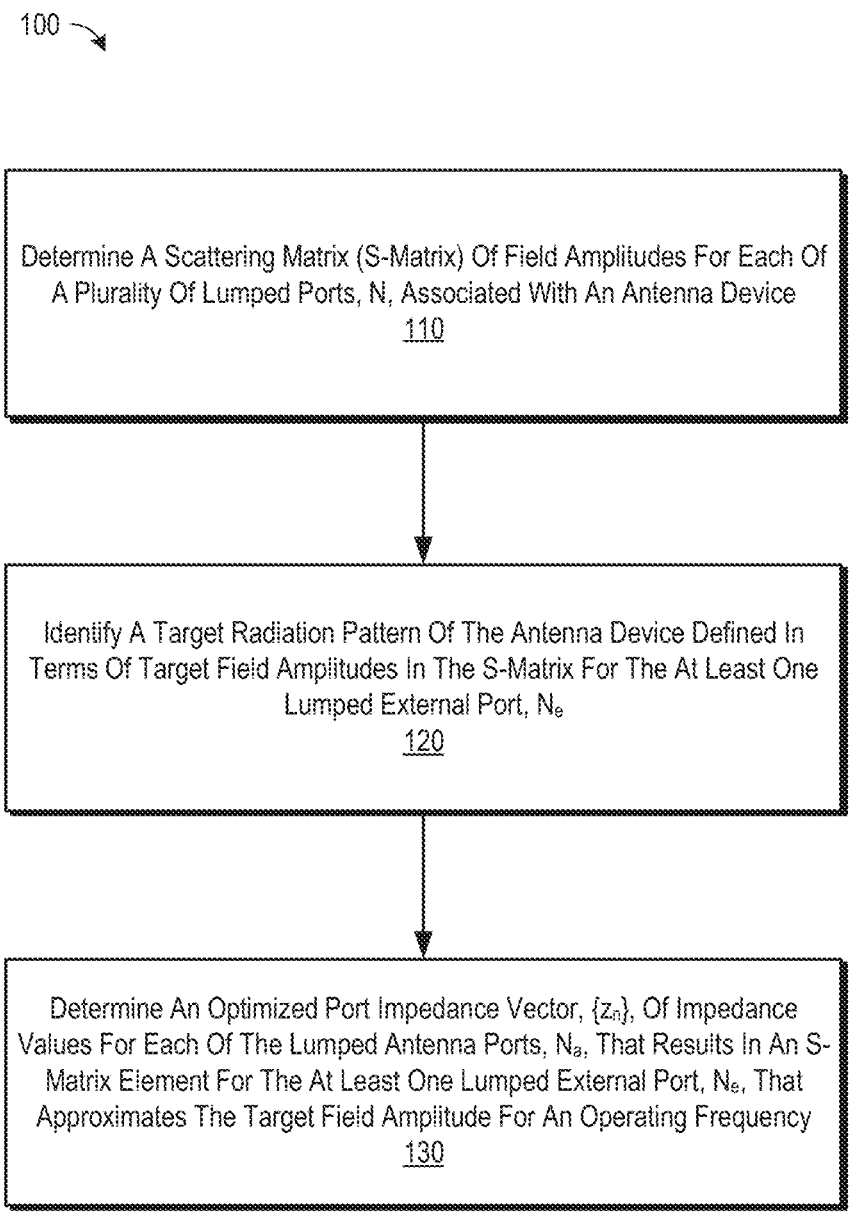
FIG. 1 is a flow chart of one embodiment of a method for radiation patterning by optimizing variable impedance values associated with an S-Matrix that includes at least one lumped port external to an antenna system.

Various embodiments, systems, apparata, and methods are described herein that relate to radiation and electromagnetic field patterning for communication, wireless power transfer, and other uses. Tunable metamaterial devices may be used to solve various electromagnetic field-based issues. By tuning individual elements of a densely packed metamaterial array, a wide variety of customizable radiation patterns may be attained. In many instances of this disclosure, metamaterial elements are used as example embodiments of sub-wavelength antenna elements. It is, however, appreciated that any of a wide variety of sub-wavelength antenna elements may be utilized that may or may not be classified as metamaterials.

Optimizing the tuning of the individual sub-wavelength antenna elements or groups of elements to attain a target radiation pattern may be done in a wide variety of manners. Many of these approaches, however, result in one or a small number of potential tuning solutions, without giving any assurance that any of these solutions represent the best solution (global optimum) and/or without providing any indication of how close to the global optimum the solution might be. Exhaustive computations using traditional methods may be too computationally intensive and/or infeasible for real-time tuning and for switching.

The complexity of the optimization problem may increase rapidly with the complexity of the device. In many embodiments, the complexity increases exponentially with the number of tunable or selectable elements. Thus, standard optimization approaches for tuning elements of an array of sub-wavelength antenna elements may require cost functions to be evaluated a large number of times. The number of tunable elements of the antenna system may be expressed as the degrees of freedom (DoF) of an antenna device. The DoF may be based on the number of antenna elements, associated tunable elements, and/or other tunable or adjustable components associated with an antenna system. As the DoF increases, the complexity is likely to increase exponentially, leading to optimization problems for which global or even quasi-global solutions are prohibitively computationally expensive for even moderate device complexity.

The present systems and methods provide optimization solutions for arrays of antenna elements and associated tunable (i.e., variable) lumped impedance elements in which the optimization solutions are rational multivariate functions. Accordingly, globally optimal solutions may be found by solving optimization problems that scale linearly with the DoF. The optimization approach can be simplified by making the cost function dependent on one matrix-value input (such as an impedance matrix, Z-Matrix) that can be calculated by performing no more than N linear system simulations. In the present application, N is an integer corresponding to the number of variable (e.g., tunable) impedance elements associated with an antenna system.

The cost function, although still nonlinear, may have a specific rational form that permits exhaustive enumeration of all local extrema. A global maximum (or minimum) can be selected from the local extrema. For rational function, the extrema are found by solving multivariate polynomial equations. Root enumeration and/or numerical calculations of the multivariate polynomial equations may allow for specialized treatment.

Tunable metamaterials, including two-dimensional metasurface devices, may comprise an array of unit cells. Each unit cell may be modeled as a sub-wavelength antenna element associated with one or more variable impedance elements. Each variable impedance element may be associated with one or more sub-wavelength antenna elements. Each impedance element or group of impedance elements may be variably controlled based on one or more impedance control inputs. The tuning may be a one-time static tuning that is performed during the manufacturing of the antenna device, or the tuning may be a dynamic process that occurs during operation by modifying one or more control inputs.

As an example of static tunability, a metamaterial device may be manufactured using a 3D printer and the tuning may comprise selecting a material or combination of materials that results in a specific electromagnetic or electrical property for each of the impedance elements. By uniquely selecting the material or combination of materials for each of the unit cells, a metamaterial antenna device may be statically tuned to a specific radiation pattern. Alternatively, each unit cell may be modeled to include a lumped impedance element with (at least) one input and (at least) one output. The input(s) may be dynamically manipulated during operation to dynamically tune the antenna device in real-time to allow for a wide range of selectable target radiation patterns.

As previously described, the system may be modeled to include lumped impedance elements that can be passive, active, or variably passive-active. At a given frequency, each impedance element may be fully described by the complex value of its impedance "z." A positive integer N may be used to describe the number of tunable or variable lumped impedance elements in an antenna system. A diagonal square matrix of size N may have diagonal elements $z_n$ representative of the nth elements of the antenna system. Alternatively, an N-dimensional complex vector, $\{z_n\}$, can be used to represent the n-valued list of impedance values.

Each variable impedance element may be modeled as a port (e.g., a lumped port and/or a wave port). A plurality of lumped ports, N, may include a plurality of lumped antenna ports, $N_a$, with impedance values corresponding to the impedance values of each of the variable impedance elements, and at least one lumped external port, $N_e$, that may or may not have a variable impedance or any impedance at all. That is, the z value of the modeled lumped external port, $N_e$, may be zero and represent an idealized shorted port. Alternatively, the z value of the modeled lumped external port, $N_e$, may be infinity and represent an idealized open port. In many embodiments, the z value of the external port, $N_e$, may be a complex value with a magnitude between zero and infinity.

Regardless of the impedance values of each of the lumped ports, N, including the lumped antenna ports, $N_a$, and the at least one lumped external port, $N_e$, each of the lumped ports (or in some embodiments wave ports) may have its own self-impedance and the network of ports may be described by an N×N impedance matrix (Z-Matrix) or by the equivalent inverse admittance matrix (Y-Matrix) where $Y=Z^{-1}$. Additionally, the network of ports can be modeled as an S-parameter matrix or scattering matrix (S-Matrix). The Z-Matrix and its inverse the Y-Matrix are independent from the specific z values of the ports because the matrix elements are defined as $Z_{nm}=V_n/I_m$, where $V_n$ and $I_m$ are the voltage at port n and the current at port m, measured with all other ports open. That is, assuming port currents $I_k=0$ for all k not equal to m or n. Similarly, for the admittance matrix, $Y_{nm}=I_m/V_n$, measured with all other ports open. Again, that is assuming port currents $I_k=0$ for all k not equal to m or n.

The S-Matrix is expressible through the Z or Y matrices and the values of the lumped impedance elements as follows:

$$S=(\sqrt{y}Z\sqrt{y}-1)(\sqrt{y}Z\sqrt{y}+1)^{-1}=(1-\sqrt{z}Y\sqrt{z})(1+\sqrt{z}Y\sqrt{z})^{-1}$$

In the equation above, the "1" represents a unit matrix of size N. The S-Matrix models the port-to-port transmission of off-diagonal elements of the N-port antenna system. In a lossless system, the S-Matrix is necessarily unitary. If elements $s_n$ are the singular values of the S-Matrix, which are the same as the magnitudes of the eigenvalues, it can be stated that in a lossless system, all $s_n=1$. In general, if $s_{max}$ is the largest singular value, then for a passive lossy system it can be stated that $s_n \leq s_{max} \leq 1$.

In an active system, these bounds still hold, however $s_{max}$ can now exceed unity, representing an overall power gain for at least one propagation path. The Z and Y matrices are diagonalized in the same basis represented by a unitary matrix U ($U^{\dagger}=U^{-1}$), such that $Z=U^{\dagger}Z_dU$, $Y=U^{\dagger}Y_dU$, where the subscript d indicates a diagonal matrix, the elements of which are complex-valued eigenvalues of the corresponding matrix.

Generally speaking, unless $\sqrt{z}$ is proportional to a unit matrix (i.e., all lumped element impedances are equal), the S-Matrix will not be diagonal in the U-basis. In the U-basis, the general form of the S-Matrix is $S=U^{\dagger}(1-\zeta Y_d\zeta)(1+\zeta Y_d\zeta)^{-1}U$, where a new non-diagonal matrix $\zeta=U\sqrt{z}U^{\dagger}$ is used such that $\sqrt{z}=U^{\dagger}\zeta U$, and $Y_d$ is diagonal, though not generally commutative with $\zeta$.

The S-Matrix of the system can be numerically evaluated with any desired accuracy by solving exactly N linear system problems (e.g., $Z_{nm}=V_n/I_m$ or $Y_{nm}=I_m/V_n$ and the associated open port conditions described above). Such problems may be solved with Finite Element Methods (FEM) or finite-difference time-domain (FDTD) based solvers for linear electromagnetic systems. Examples of commercially available solvers include ANSYS HFSS, COMSOL, and CST. These numerical simulations incorporate various fine effects of the near-field and far-field interactions between various parts of the system, regardless of complexity.

The Z-Matrix and/or the Y-Matrix can be evaluated based on a knowledge of the S-matrix and the impedance values. With many FEM solvers, it is also possible to directly evaluate the Z-Matrix or the Y-Matrix, by solving $N^2$ linear problems. This approach, however, is N times less efficient than calculating the S-Matrix with a fixed set of port impedance values (known as reference impedance values), and transforming it to Z and/or Y.

In various embodiments, an antenna system may include a plurality of sub-wavelength antenna elements. The sub-wavelength antenna elements may each have a maximum dimension that is less than half of a wavelength of the smallest frequency within an operating frequency range. One or more of the sub-wavelength antenna elements may comprise a resonating element. In various embodiments, some or all of the sub-wavelength antenna elements may comprise metamaterials. In other embodiments, an array of the sub-wavelength antenna elements (e.g., resonating elements) may be collectively considered a metamaterial.

In various embodiments in which at least some of the sub-wavelength antenna elements comprise resonating elements, the resonating elements may have quality factors exceeding 10, 100, or even 1000 depending on the application. Some resonating elements may include superconductors to achieve the specific quality factors.

The resonating elements may have at least one electric dipole resonance at a frequency within or proximate the operational frequency band. The resonating elements have at least one magnetic dipole resonance at a frequency within or proximate the operational frequency band. In various embodiments, the resonance frequencies of the resonating elements are controlled by the impedance values of the lumped impedance elements.

The sub-wavelength antenna elements may have inter-element spacings that are substantially less than a free-space wavelength corresponding to an operating frequency or frequency range. For example, the inter-element spacings may be less than one-half or one-quarter of the free-space operating wavelength. The inter-element spacings, or antenna element density, may be significant based on the intended use. For example, it is understood that a Gaussian beam is the tightest-waist beam possible given the laws of diffraction. The minimum waste diameter of a Gaussian beam is roughly one wavelength.

Many of the descriptions and illustrates provided herein are described relative to two-dimensional modeling (mathematically and/or graphically) that can be extrapolated for a three-dimensional model or system by one of skill in the art. Given the similarities between two-dimensional models and illustrates and three-dimensional models, the disclosure utilizes terms like "diameter" and "radius" that are applicable to the three-dimensional embodiments to describe attributes of the two-dimensional embodiments. Moreover, a discussion of antenna element density above may be understood with reference to the illustrates and two-dimensional descriptions as a linear density. However, it is appreciated that the same description can be understood in the context of a three-dimensional array of antenna elements as relating to a three-dimensional array of antenna elements.

In various embodiments, a waist equation for Gaussian beams may be used determine the spot size (or two-dimensional equivalents) for various far-field propagation distances. The waist equation is given by:

$$w(z) = w_0 \sqrt{1 + \left(\frac{z}{z_R}\right)^2},$$

where
$z_R = \pi w_0^2/\lambda$ is the Rayleigh range. The Rayleigh range can be understood as approximately the same as the Fraunhofer/far-field distance for an aperture equal to the minimum waist size, $w_0$.

For metamaterial surface antennas utilizing an array of sub-wavelength antenna elements, diffraction still limits the minimum possible beam waist to about half-wavelength. To achieve Gaussian beams with the tightest possible waists, the spatial Fourier spectrum of the radiated mode must contain transverse wavenumbers close to maximum free space number with an accurate spectrum sampling. If the sub-wavelength antenna element spacing is approximately two per wavelength, then the waist of the minimum waist size of a generated beam will be relatively large. Such an embodiment with approximately two sub-wavelength antenna per wavelength would correspond well to a conventional phases array. Such an embodiment might be suitable for some far-field applications, but is less useable for radiative near field applications.

In contrast, by increasing the element density to four, eight, or even more sub-wavelength antenna elements per wavelength, the tighter Gaussian beams can be formed with a greater power density concentrated within a minimum possible waste size.

The antenna system may be configured to operate in a wide variety of operating frequency ranges, including, but not limited to, microwave frequencies. The presently described systems and methods may be adapted for use with other frequency bands, including those designated as very low frequency, low frequency, medium frequency, high frequency, very high frequency, ultra-high frequency, super-high frequency, and extremely high frequency or millimeter waves.

In various embodiments, for efficient wireless power transfer it may be desirable to utilize frequencies that propagate well within an expected usage environment. Molecular absorption and small-particle scattering increase rapidly with frequency. However, the smaller wavelengths (higher frequencies) allow for decreased aperture sizes of the array of sub-wavelength antenna elements. The tradeoff between keeping the aperture size small and having reasonably low attenuation may be decided on a case-by-case basis based on an expected usage environment and application sizing requirements. In some embodiments, the W-band may be particularly useful due to reduced atmospheric absorption between approximately 70 and 110 GHz. For example, frequencies between 93 and 96 GHz might be used in one particular embodiment.

Various embodiments, usage scenarios, applications, and system variables may make it desirable to operate a communication and/or wireless power transfer system in any of a wide variety of frequency ranges, including but not limited to the following known ranges: 30-300 kHz, 0.3-3 MHz, 3-30 MHz, ISM band (e.g., centered at 13.56 MHz), 6.78 MHz, and ISM band centered at 40.68 MHz. Additional possible operating frequency ranges include, but again are not limited to: between 300 MHz and 300 GHz, a decimeter wave frequency, the 2.45 GHz ISM band, a centimeter wave frequency, the 5.8 GHz ISM band, the 24.125 GHz ISM band, the 61.25 GHz ISM band, the 94-96 GHz atmospheric transparency window, and/or a millimeter wave frequency.

In some embodiments, each of the sub-wavelength antenna elements is associated with at least one lumped impedance element. A common transmission line (TL) may be coupled to the sub-wavelength antenna elements via the lumped impedance elements. Alternative waveguides may be used instead of or in addition to TLs. Each lumped impedance element may have a variable impedance value that may be at least partially based on the connected sub-wavelength antenna element(s) and/or a connected TL or other waveguide(s). A waveguide or TL may be modeled as another port in the S-Matrix in some embodiments, such as in Heretic-like architectures with variable couplers.

In other embodiments, an array or other plurality of sub-wavelength antenna elements may be configured to scatter received electromagnetic fields transmitted by an independent and/or separate antenna transmitter and/or to an independent and/or separate antenna receiver. Thus, for many of the various embodiments described herein, it is appreciated that the array or other plurality of sub-wavelength antenna elements may be used to directly transmit and/or receive electromagnetic radiation or alternatively scatter (in a controlled manner) electromagnetic radiation to or from another antenna. Thus, the electromagnetic fields received by the plurality of sub-wavelength antenna elements may be generated by a source external to the wireless power transmitter or via a transmission line (e.g., a waveguide).

In embodiments in which the sub-wavelength antenna elements receive electromagnetic fields from a transmission line, the sub-wavelength antenna elements may receive the electromagnetic fields from one or locations on the transmission line to which the wireless power transmitter is evanescently coupled. The sub-wavelength antenna elements may receive electromagnetic fields generated by a slot in a transmission line, an inductive element coupled to a transmission line, a capacitive element coupled to a transmission, and/or other combination of discretely coupled or integrated devices.

Examples of transmissions lines include, but are not limited to, rectangular waveguides, parallel-plate waveguides, microstrip lines, and coaxial lines. Electromagnetic fields may also be received for scattering by the plurality of sub-wavelength antenna elements from one or more of a short dipole antenna, a resonant dipole antenna, a have-wavelength dipole antenna, a loop antenna, a resonant loop antenna, a patch antenna, a horn antenna, and a dish antenna.

The impedance of each of the lumped impedance elements may be variably adjusted through one or more impedance control inputs. The number of sub-wavelength antenna elements, associated impedance elements, and the number of impedance control inputs may be a 1:1:1 ratio or an X:Y:Z, where X, Y, and Z are integers that may or may not be equal. For instance, in one embodiment there may be a 1:1 mapping of impedance elements to sub-wavelength antenna elements while there is only one-tenth the number of impedance control inputs.

In various embodiments, the modeled lumped external port, $N_e$, may or may not be associated with a variable impedance element. In some embodiments, the lumped external port, $N_e$, is modeled as an external port with an infinitesimal volume located at a particular radius-vector relative to the antenna device. The lumped external port, $N_e$, may be in the far-field of the antenna device, the radiative near-field of the antenna device, or the reactive near-field of the antenna device.

In some embodiments, the lumped external port, $N_e$, may comprise a virtual port, an external region of space assumed to be a void, a region of space assumed to be filled with a dielectric material, and/or a location in space assumed to be filled with a conductive, radiative, reactive, and/or reflective material. In at least some embodiments, the lumped external port, $N_e$, comprises a receiving antenna.

The lumped external port, $N_e$, may also be modeled as a virtual external port, comprises a field probe, as measured by a non-perturbing measurement. In other embodiments, the virtual external port may represent a numerical field probe, as calculated using a numerical simulation. The field probe may correspond to a field amplitude measured by anon-perturbing measurement or a numerical field probe. The numerical field probe may correspond to an electromagnetic field amplitude calculated using a numerical simulation.

As previously described, in some embodiments, a unique lumped impedance element may be associated with each sub-wavelength antenna element. In other embodiments, a plurality of sub-wavelength antenna elements may be grouped together and associated with a single, variable, lumped impedance element. Conversely, a plurality of lumped impedance elements may be associated with a single sub-wavelength antenna element. In such an embodiment, the impedance of each of the plurality of lumped impedance elements may be controlled individually, or only some of them may be variable. In any of the above embodiments, X impedance control inputs may be varied to control the impedance of Y lumped impedance elements, where X and Y are integers that may or may not be equal.

As a specific example, 1,000 unique impedance control inputs may be provided for each of 1,000 unique lumped impedance elements. In such an embodiment, each of the impedance control inputs may be varied to control the impedance of each of the lumped impedance elements. As an alternative example, 1,000 unique lumped impedance elements may be controlled to be variably addressed by a binary control system with 10 inputs.

In some embodiments, one or more of the impedance control inputs may utilize the application of a direct current (DC) voltage to variably control the impedance of the lumped impedance element based on the magnitude of the applied DC voltage. In other embodiments, an impedance control input may utilize one or more of an electrical current input, a radiofrequency electromagnetic wave input an optical radiation input, a thermal radiation input, a terahertz radiation input, an acoustic wave input, a phonon wave input, a mechanical pressure input, a mechanical contact input, a thermal conduction input, an electromagnetic input, an electrical impedance control input, and a mechanical switch input. In various embodiments, the lumped impedance elements may be modeled as two-port structures with an input and an output.

The lumped impedance elements may comprise one or more of a resistor, a capacitor, an inductor, a varactor, a diode, a MEMS capacitor, a BST capacitor, a tunable ferroelectric capacitor, a tunable MEMS inductor, a pin diode, an adjustable resistor, an HEMT transistor, and/or another type of transistor. Any of a wide variety of alternative circuit components (whether in discrete or integrated form) may be part of a lumped impedance element. A lumped impedance element may comprise a liquid-crystal-filled tunable capacitor, a liquid-crystal-filled tunable resonator, a split ring resonator, a spiral resonator, an electric inductor-capacitor (ELC or electric-LC) resonator, a complementary split ring resonator, a tunable ferroelectric capacitor, a tunable MEMS inductor, and/or a complementary ELC resonator.

In some embodiments, at least one of the lumped impedance elements may comprise a memory element, such as a volatile or non-volatile memory element. A volatile memory element may include a transistor, a capacitor, and/or a flip-flop circuit. Volatile memory elements may be addressable using, for example, row and column addressing schemes.

Similarly, at least one of the lumped impedance elements may comprise a non-volatile memory element. The non-volatile memory element may include a floating-gate transistor, a non-volatile ferroelectric RAM element, and/or a non-volatile magnetoresistive RAM element. Non-volatile memory elements may be addressable using, for example, row and column addressing schemes.

One or more of the lumped impedance elements may be connected to and collocated with a tunable microelectronic circuit. In various embodiments, some of the lumped impedance elements are connected to and collocated with tunable microelectronic circuits addressable using a row and column addressing scheme. In some embodiments, one or more of the lumped impedance elements are connected to and collocated with a tunable microelectronic circuit located at the intersection of a word line and a bit line, and connected to both the word line and the bit line.

One or more hardware, software, and/or firmware solutions may be employed to perform operations for radiation patterning by controlling the impedance values of the lumped impedance elements via the one or more impedance control inputs. For instance, a computer-readable medium (e.g., a non-transitory computer-readable medium) may have instructions that are executable by a processor to form a specific radiation pattern. The executed operations or method steps may include determining a scattering matrix (S-Matrix) of field amplitudes for each of a plurality of lumped ports, N.

The lumped ports, N, may include a plurality of lumped antenna ports, $N_a$, with impedance values corresponding to the impedance values of the plurality of physical impedance elements. In at least some embodiments, the modeled lumped ports, N, include at least one external port, $N_e$, that is located physically external to the antenna system. In some embodiments, the lumped ports, N, also include a TL or other waveguide as another lumped port for the calculation of the S-Matrix.

The S-Matrix is expressible in terms of an impedance matrix, Z-Matrix, with impedance values, $z_n$, of each of the plurality of lumped ports, N. Thus, by modifying one or more of the impedance values, $z_n$, associated with one or more of the plurality of lumped ports, N, a desired S-Matrix of field amplitudes can be attained. The operations or method steps may include identifying a target radiation pattern of the antenna system defined in terms of target field amplitudes in the S-Matrix for the at least one lumped external port, $N_e$.

An optimized port impedance vector $\{z_n\}$ of impedance values $z_n$ for each of the lumped antenna ports, $N_a$, may be calculated that results in S-Matrix elements for the one or more lumped external ports, $N_e$, that approximates the target field amplitude for a given operating frequency. Once an optimized $\{z_n\}$ is identified that will result in the desired field amplitude values for the S-Matrix elements of the one or more lumped external ports, $N_e$, the variable impedance control inputs may be adjusted as necessary to attain the optimized $\{z_n\}$.

As an example, a target field amplitude in the S-Matrix for a lumped external port, $N_e$, may correspond to a null in the field amplitude of the target radiation pattern. Alternatively, the target field amplitude in the S-Matrix for a lumped external port, $N_e$, may be maximized.

Any number of lumped external ports, $N_e$, may be used as part of the S-Matrix calculation. Using a plurality of lumped external ports, $N_e$, may allow for the definition of a radiation pattern having a plurality of side lobes, main lobes, and/or nulls. Thus, the S-Matrix may be calculated with a plurality of lumped external ports located external to the antenna device. The target field amplitudes in the S-Matrix for each of the lumped external ports may correspond to a target radiation pattern for the antenna device for a specific frequency range.

In various embodiments, at least one of the plurality of lumped antenna ports, $N_a$, is strongly mutually coupled to at least one other lumped antenna port, $N_a$. In some embodiments, at least one of the lumped external ports, $N_e$, is mutually coupled to one or more of the lumped antenna ports, $N_a$. Strongly mutually coupled devices may be those in which an off-diagonal Z-Matrix element $Z_{ij}$, is greater in magnitude than one-tenth of the $\max(|Z_{ii}|, |Z_{jj}|)$.

Determining an optimized $\{z_n\}$ may include calculating an optimized Z-Matrix using one or more of a variety of mathematical optimization techniques. For example, the optimized $\{z_n\}$ may be determined using a global optimization method involving a stochastic optimization method, a genetic optimization algorithm, a Monte-Carlo optimization method, a gradient-assisted optimization method, a simulated annealing optimization algorithm, a particle swarm optimization algorithm, a pattern search optimization method, a Multistart algorithm, and/or a global search optimization algorithm. Determining the optimized $\{z_n\}$ may be at least partially based on one or more initial guesses.

Depending on the optimization algorithm used, the optimized values may be local optimizations based on initial guesses and may not in fact be true global optimizations. In other embodiments, sufficient optimization calculations are performed to ensure that a true globally optimized value is identified. In some embodiments, a returned optimization value or set of values may be associated with a confidence level or confidence value that the returned optimization value or set of values corresponds to global extrema as opposed to local extrema.

For gradient-assisted optimization, a gradient may be calculated analytically using an equation relating an S-parameter of the S-Matrix to the Z-Matrix and the optimized $\{z_n\}$. In some embodiments, a Hessian matrix calculation may be utilized that is calculated analytically using the equation relating the S-parameter to the Z-Matrix and the optimized $\{z_n\}$. A quasi-Newton method may also be employed in some embodiments. In the context of optimization, the Hessian matrix may be considered a matrix of second derivatives of the scalar optimization goal function with respect to the optimization variable vector.

In some embodiments, the global optimization method may include exhaustively or almost exhaustively determining all local extrema by solving a multivariate polynomial equation and selecting a global extrema from the determined local extrema. Alternative gradient-based methods may be used, such as conjugate gradient (CG) methods and steepest descent methods, etc. In the context of optimization, a gradient may be a vector of derivatives of the scalar optimization goal function with respect to the vector of optimization variables.

Exhaustively determining all local extrema may be performed by splitting the domain based on expected roots and then splitting it into smaller domains to calculate a single root or splitting the domain until a domain with a single root is found. Determining the optimized $\{z_n\}$ may include solving the optimization problem in which a simple case may include a clumped function scalar function with one output and N inputs. The N inputs could be complex $z_n$ values and the optimized Z-Matrix may be calculated based on an optimization of complex impedance values of the $z_n$ vectors.

The optimized $\{z_n\}$ may be calculated by finding an optimized Z-Matrix based on an optimization of complex impedance values $z_n$. The optimized $\{z_n\}$ may be calculated by finding an optimized Z-Matrix based on an optimization of roots of complex values of the impedance values $z_n$. The optimized $\{z_n\}$ may be calculated by finding an optimized Z-Matrix based on an optimization of reactances associated with the impedance values of the impedance values $z_n$. The optimized $\{z_n\}$ may be calculated by finding an optimized Z-Matrix based on an optimization of resistivities associated with the impedance values of the impedance values $z_n$.

In some embodiments, the optimization may be constrained to allow only positive or inductive values of reactances, or only negative or capacitive values of reactances. In other embodiments, the optimization of resistivities may be constrained to only allow for positive or passive values of resistivities.

The optimized $\{z_n\}$ may be calculated by finding an optimized Z-Matrix based on an optimization of the impedance control inputs associated with the lumped impedance elements of each of the sub-wavelength antenna elements. The optimized $\{z_n\}$ may be calculated by optimizing a nonlinear function. The nonlinear function may relate impedance values for each of the lumped antenna ports, $N_a$, as modeled in the S-Matrix and the associated impedance control inputs. In some embodiments, the nonlinear function may be fitted to a lower-order polynomial for optimization.

Mapping the Z-Matrix values to the S-Matrix values may comprise a non-linear mapping. In some instances, the mapping may be expressible as a single- or multivariate polynomial. The polynomial may be of a relatively low order (e.g., 1-5). The S-Matrix may comprise N values and the Z-Matrix may comprise M values, where N and M are both integers and equal to one another, such that there is a 1:1 mapping of S-Matrix values and Z-Matrix values. Any of a wide variety of mappings are possible. For example, the S-Matrix may comprise N values and the Z-Matrix may comprise M values, where N squared is equal to M. Alternatively, there may be a 2:1 or 3:1 mapping or a 1:3 or 2:1 mapping.

The physical location of the at least one lumped external port, $N_e$, may be associated with a single-path or multipath propagation channel that is electromagnetically reflective and/or refractive. The multipath propagation channel may be in the near-field. In a radiative near-field, the multipath propagation pattern may be in the reactive near-field.

As previously described, the field amplitudes in the S-Matrix may be used to define a target radiation pattern. In some embodiments, the target radiation pattern of the antenna device may be defined in terms of a target field amplitude for a single linear field polarization. The target radiation pattern may be defined in terms of a plurality of field amplitudes for a plurality of lumped external ports, $N_e$. The target radiation pattern may be defined in terms of a target field amplitude for at least two linear polarizations.

The target field amplitudes for one or more lumped external ports, $N_e$, may be selected to decrease far-field sidelobes of the antenna device, decrease a power level of one or more sidelobes of the antenna device, change a direction of a strongest sidelobe of the antenna device, increase a uniformity of a radiation profile in the near-field, and/or minimize a peak value of field amplitudes in the near-field. The system may utilize a minimax approximation algorithm to minimize a peak value of field amplitudes in the near-field.

Determining the optimized $\{z_n\}$ of impedance values for each of the lumped antenna ports, $N_a$, may include determining an optimized set of control values for the plurality of impedance control inputs that results in an field amplitude for the at least one lumped external port, $N_e$, in the S-Matrix that approximates the target field amplitude for a given operating frequency or frequency range.

In conformity with the antenna systems and associated methods described above, a plurality of lumped antenna ports, $N_a$, with impedance values corresponding to the impedance values of each of the plurality of lumped impedance elements may be considered jointly with one or more external ports, $N_e$, whose purpose is to account for the field intensity at a particular location exterior to the antenna system. The external port, $N_e$, may represent an actual receive antenna, in which case a known input impedance of that port may be assigned to the external port, $N_e$. In other embodiments, the one or more external ports, $N_e$, may be merely conceptual and used to quantify one or more field intensities at one or more locations. The external port, $N_e$, may be assumed infinitesimal in area and/or volume and located at a particular radius-vector $\vec{r}_0$.

Regardless of the number of external ports, $N_e$, the total number of ports N will correspond to the number of lumped antenna ports, $N_a$, and the number of external ports, $N_e$. In some embodiments, a common port (e.g., a waveguide or TL) associated with the antenna system may also be considered. In any such embodiments, the total size of the system matrices will be generally of size N, which does not grow exponentially with the degrees of freedom or number of variable impedance elements.

The S-Matrix element $S_{1N}$ represents the complex magnitude of field (e.g., electric field) at a particular location in space, given by the radius vector $\vec{r}_0$, normalized to the field magnitude at the input port. The absolute value $|S_{1N}|$, or the more algebraically convenient quantity $|S_{1N}|^2$, quantifies the quality of field concentration at that point. Maximizing this quantity (or minimizing in the case of forming nulls) represents a generalized beamforming algorithm.

In some embodiments, the location $\vec{r}_0$, is in the far-field of the rest of the system, and the algorithm yields directive beams in the far-field. In other embodiments, the point $\vec{r}_0$ is in the radiative near-field of the rest of the system, and the algorithm yields field focusing to that point. In still other embodiments, the point $\vec{r}_0$ is within the reactive near-field of at least one part of the rest of the system, and the algorithm maximizes electric field intensity and electric energy density at that point.

To find all local optima and the global optimum we can use the equation $q_n = \sqrt{Z_n}$, which characterizes the individual port impedances $z_n$. The equation above, $S=U^\dagger(1-\zeta Y_d \zeta)(1+\zeta Y_d \zeta)^{-1}U$, is a rational (and meromorphic) analytical function of $\{q_n\}$.

To make this function bounded, and find its maxima that are attainable in a passive system, the function may be restricted to the multidimensional segment satisfying $\mathrm{Re}(z_n) \geq 0$, n=1, ..., N. Equivalently, this condition is $-\pi/2 \leq \arg z_n \leq \pi/2$, and consequently $-\pi/4 \leq \arg q_n \leq \pi/4$.

To reduce this problem to real values, each $q_n$ variable can be expressed through real variables, $q_n = \rho_n + i\xi_n$. In this manner, the real valued function $|S_{1N}|^2$ is now a function of 2N real variables $\rho_n, \xi_n$, which is a rational function comprising a ratio of two 2N-variate polynomials.

In some embodiments, the resistance of each lumped element can be neglected by assuming $\mathrm{Re}(z_n)=0$, $z_n = ix_n$, with the real reactance values $x_n$. In such embodiments, the system as a whole is still assumed passive and lossy with the losses occurring on the paths between the ports and incorporated into the Z-Matrix (or Y-Matrix). This approximation satisfies the passivity constraints and also reduces the number of variables to N because $\sqrt{Z}Y\sqrt{Z} \to i\sqrt{x}Y\sqrt{x}$, and x is purely real.

The function $|S_{1N}|^2$ is necessarily bounded for a passive system, and therefore it has a finite global maximum as a function of real-valued variables $\rho_n, \xi_n$. Moreover, it has a finite number of local extrema. These extrema can be found by solving a set of 2N multivariate polynomial equations given by the standard zero gradient condition at the extremum:

$$\frac{\partial |S_{1N}|^2}{\partial \rho_n} = 0, \; \frac{\partial |S_{1N}|^2}{\partial \xi_n} = 0, n=1, \ldots, N.$$

In the simplified approach above, there are N unknowns $\chi_n = \sqrt{x_n}$ and N extremum conditions, $$\text{so } \frac{\partial |S_{1N}|^2}{\partial \chi_n} = 0, n=1, \ldots, N.$$

Once these extrema are found, the extremal values of the function are evaluated numerically, and the global maximum is determined by choosing the largest local maximum. A similar approach can be performed to identify one or more minimums to attain a target radiation pattern with a null at one or more specific radius vectors $\vec{r}_0$.

Numerical and symbolic-manipulation algorithms exist that take advantage of the polynomial nature of the resulting equations. For example, Wolfram Mathematica™ function Maximize supports symbolic solving of the global optimization problem for multivariate polynomial equations, unconstrained or with multivariate polynomial constraints. This function is based on a Groebner-basis calculation algorithm, which reduces the multidimensional polynomial system to a triangular system, which is then reduced to a single scalar polynomial equation by back-substitution. Similar functionality exists in other software packages, including MATLAB™ with Symbolic Math Toolbox™, Maple™ and so on.

As previously discussed, once values are determine for each of the $z_n$ for the variable or tunable lumped impedance elements associated with the sub-wavelength antenna elements, each of the impedance elements can be tuned. In some embodiments, the tuning is static and the impedance values are set at the manufacturing stage. In other embodiments, a physical stimulus (e.g., mechanical, electric, electromagnetic, and/or a combination thereof) may be used to dynamically tune impedance elements to dynamically modify the radiation pattern of the antenna system during operation.

Depending on the manufacturing techniques employed (e.g., 3D printing) the calculated values of optimum impedance values may translate trivially into the choices made for the selectable impedance elements. In contrast, for the dynamically adjustable, variable, or tunable impedance elements, there is generally a non-trivial relationship between the complex impedance of the elements and the stimuli that control them. In some embodiments, the relationship between the complex impedance of the impedance elements and the control inputs may be based on a magnitude of an applied signal. Appreciating that the magnitude of the stimulus may be binary in some embodiments (i.e., on or off), the relationship may be modeled as $z_n = f_n(s_n)$, where $s_n$, is the real-valued magnitude of the stimulus. The function $f_n(s_n)$ can be fitted with a polynomial order S, and substituted into $|S_{1N}|^2$. The functions $f_n$ can be all the same when identical dynamically tunable elements are used, in which case there will be N extremum conditions for N real variables $s_n$, each of which is still a rational function.

In the lowest-order approximation, the fitting polynomial can be linear (S=1), in which case the complexity of the extremum problem is still $$\frac{\partial |S_{1N}|^2}{\partial \chi_n} = 0, n = 1, \ldots, N.$$

The quality of a polynomial approximation depends greatly on the practically available range of the stimulus, or the range chosen for other practical considerations. Because the $S_n$ variables are restricted to a finite interval, the optimization problem can be solved with the corresponding constraints. When the optimization problem is solved by exhaustive enumeration of the extrema, these constrains are applied trivially and the local extrema not satisfying the constraints are excluded from the enumeration.

A wide range of adaptive beamforming applications are contemplated and made possible using the systems and methods described herein. For example, in some embodiments, beamforming may include a multipath propagation channel involving one or more reflective, refractive, or generally scattering object. In many embodiments, the relevant properties of the multipath propagation channel are incorporated into the Z-Matrix. Numerical simulations that lead to a calculation of the Z-Matrix may include a model of such a channel. A model of the multipath propagation channel can be simulated using any of a wide variety of simulation software packages, including, for example, ANSYS HFSS, COMSOL RF, CST MWS, etc.

In some embodiments, a particular linear field polarization can be achieved by considering the output port to be a port susceptible to only one linear polarization. For instance, a lumped (electrically small, single-mode) port is susceptible to a linear polarization with the electric field directed across the gap of the port.

In some embodiments, a target radiation pattern may be identified that includes a combination of two linear polarizations, including without limitation a circular polarization, that can be achieved by considering two co-located output ports, each of which is susceptible to only one linear polarization. In such an embodiment, the system matrices may be slightly increased by the addition of more external ports, $N_e$, but the addition of a few external ports increases the complexity by a relatively small constant value and will not change the general course of the algorithms and methods described herein.

In some embodiments, multiple beams can be formed simultaneously (the process known as multi-beam forming) by considering M output ports located in different directions with respect to the rest of the system. The size of the system matrices may then correspond to $N=N_a+M+1$, which does not change the general course of the algorithm and does not exponentially increase the complexity.

As previously discussed, approximate nulls of the field can be formed, either in the far-field or near-field, by considering a minimization problem for the rational function of the equations above. Similarly, a required level of sidelobe suppression for a target radiation pattern can be attained by maximizing the function $F=|S_{1N}|^2-\alpha|S_{1,N+1}|^2$, where the $N^{th}$ port measures the field intensity in one direction, the $(N+1)^{th}$ port measures field intensity in a specified sidelobe direction, and $\alpha$ is a selectable weight coefficient reflecting the degree to which sidelobe suppression should be achieved.

It is appreciated that the equation above can be readily generalized to include any number of sidelobes in any number of directions. Thus, it is appreciated that instead of optimizing the impedance values themselves, a function relating the impedance control inputs to the impedance values of the variable (i.e., tunable) impedance elements may be substituted into the equations to allow for the direct optimization of the impedance control inputs.

The presently described systems and methods may be used to form beams or pattern radiation generation or scattering to optimize wireless power transfer between a transmitting antenna system and one or more receivers. Similarly, multiple transmitting antennas may be used to power a single receiver. The number of receivers to transmitters used for wireless power transfer may be N:M where N and M are integers that are not necessarily equal. The system may utilize the N transmitters and the M receivers and determine how to efficiently transmit power from the N transmitters to the M receivers in an efficient manner.

In one embodiment, the target electromagnetic radiation pattern is selected to optimize a power transfer from a first group of sub-wavelength antenna elements to an external lumped port that is collocated with a second group of sub-wavelength antenna elements. The first group of sub-wavelength antenna elements may be facing the second group of sub-wavelength antenna elements and/or may be mobile with respect to the second group of sub-wavelength antenna elements. In other embodiments, the second group of sub-wavelength antenna elements may be mobile with respect to the first group of sub-wavelength antenna elements.

Optimizing the power transfer may include maintaining the power transferred to a selected external lumped port below a threshold level or above a threshold level. For example, certain efficiencies might be attained above and/or below certain threshold levels. In cold situations, maintaining a transfer above at threshold level may prevent freezing and/or maintain various components of a charging or power system above a predetermined temperature. Optimizing the power transfer may include minimizing the power transferred to one lumped external port while maintaining the power transferred to another lumped external port at or above a threshold level.

Optimizing the power transfer may include minimizing the power transferred to one lumped external port while maintaining the power transferred to another lumped external port at or above a threshold level. The second lumped external port may be a virtual port corresponding to a location of a human or a location of a device. Again, optimizing the power transfer may include maintaining the power transfer above or below a threshold level. Part of the optimization may be based on heat generation associated with the power transfer above a threshold level or below a threshold level. In some embodiments, a receiver may communicate with a transmitter to ensure threshold levels are not exceeded. For example, it may be necessary to maintain a power transfer above a predetermined level to ensure that a liquid crystal based technology remains sufficiently warm to operate as intended.

In some embodiments, maintaining the power transfer below a threshold level may be beneficial if, for example, there may be a region of space within which we don't want to overexpose objects, equipment, or living things to power densities greater than a predetermined threshold. A wireless power transfer system may have a dynamic exclusion zone that can specifically limit a power density for given regions of space. Such exclusion zones may be dynamic in that they may change as the antenna (transmitter and/or receiver) moves and/or as other objects, equipment, and/or persons move within the environment. Identifying the zones that should be excluded may be a different problem solved in any number of ways as compared to the wireless power transfer system's ability to create such zones of exclusion.

Examples of components and devices that may be associated with a wireless power receiver include, but are not limited to, battery charging stations, cells within a battery, a rectifying circuit, personal electronic devices, cell phones, laptops, tablets, transformer circuits, frequency converter circuits, multiplier circuits, components of motor/electric/hybrid/fuel-cell vehicles, remotely operated vehicles, medical implants, and/or a medical device temporarily or permanently residing within a patient (e.g., within a lumen of a human).

FIG. 1 is a flow chart of one embodiment of a method 100 for radiation patterning by optimizing impedance values associated with an S-Matrix that includes at least one lumped port external to an antenna system. The method illustrated may be computer-implemented via software, hardware, firmware, and/or a processor or microprocessor. In other embodiments, the method may be implemented using an application specific integrated circuit, a field-programmable gate array, other hardware circuitry, integrated circuits, software, firmware, and/or a combination thereof. As illustrated, an S-Matrix may be determined that includes field amplitudes for each of a plurality of lumped ports, N, associated with an antenna device, at 110.

The N lumped ports may include a plurality of lumped antenna ports, $N_a$, wherein each lumped antenna port corresponds to an impedance value of a lumped impedance element in communication with at least one sub-wavelength antenna element of an antenna device, wherein the impedance value of each of the lumped impedance elements is variable based on one or more impedance control inputs, and at least one lumped external port, $N_e$, located physically external to the antenna device. In various embodiments, the S-Matrix may be expressible in terms of an impedance matrix, Z-Matrix, with impedance values, $z_n$, of each of the plurality of lumped ports, N.

Once the S-Matrix has been determined, a target radiation pattern of the antenna device may be defined in terms of target field amplitudes in the S-Matrix for the at least one lumped external port, $N_e$, at 120. An optimized port impedance vector, $\{z_n\}$, of impedance values for each of the lumped antenna ports, $N_a$, may then be determined, at 130, that results in an S-Matrix element for the at least one lumped external port, $N_e$, that approximates the target field amplitude for an operating frequency or operating frequency range.

Figure 2:
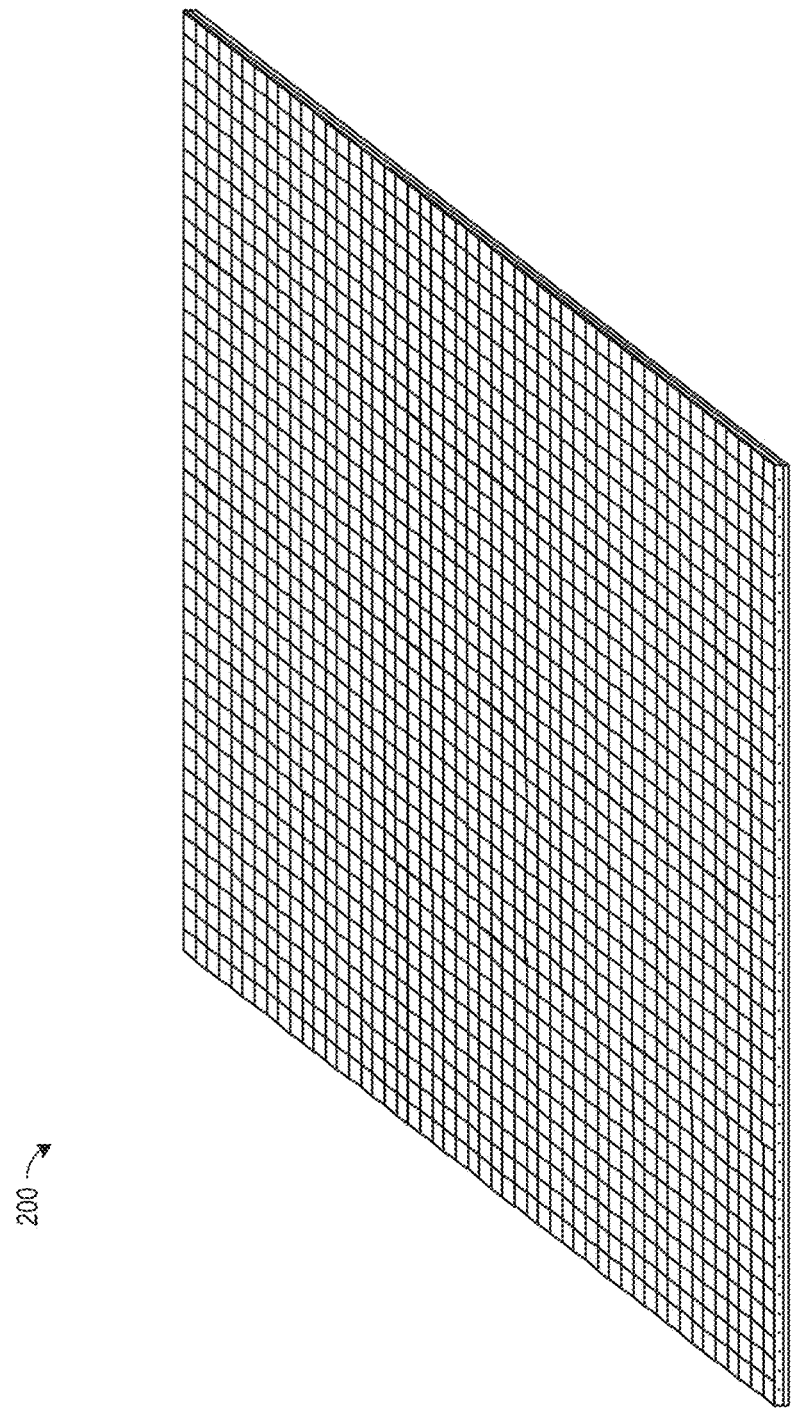
FIG. 2 illustrates an antenna system comprising an array of sub-wavelength antenna elements, according to one simplified embodiment.

FIG. 2 illustrates an antenna system comprising an array of sub-wavelength antenna elements 200, according to one simplified embodiment. The sub-wavelength antenna elements 200 may be associated with a plurality of variable or tunable impedance elements.

The array of sub-wavelength antenna elements 200 may form a two-dimensional array as illustrated, or may form a three-dimensional array. The lumped impedance elements may form any of a rectangular two-dimensional array, a square two-dimensional array, a triangular two-dimensional array, and a hexagonal two-dimensional array.

The lumped impedance elements may also be configured as a concentric-circular array with elements aligned along concentric circles. In other embodiments, the lumped impedance elements form a concentric-circular array with elements aligned along radial lines from a common center.

Figure 3A:
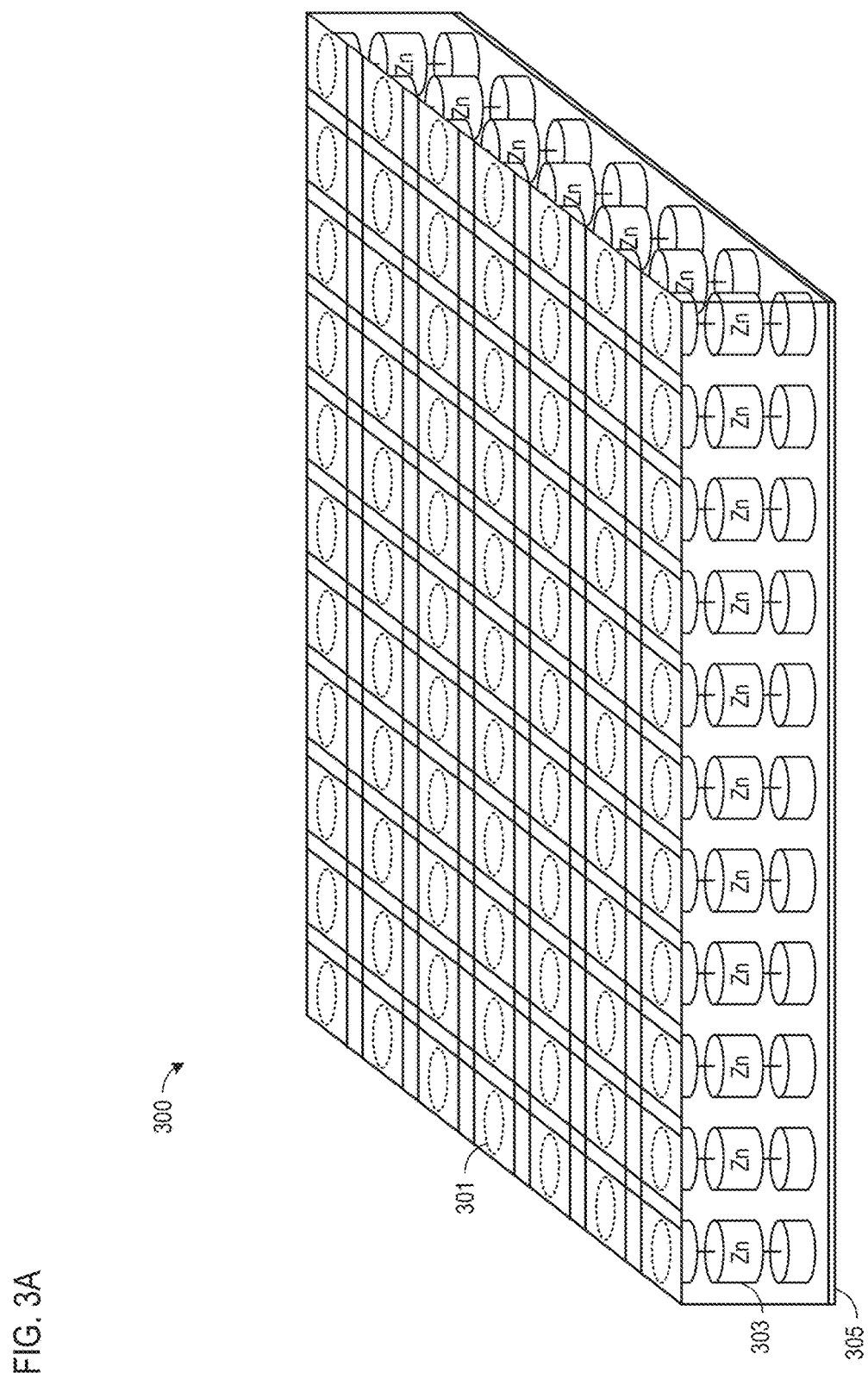
FIG. 3A illustrates a close-up view of a section of an array of sub-wavelength antenna elements with associated variable impedance elements, according to one simplified embodiment.

FIG. 3A illustrates a conceptual model of an antenna system 300 showing a section of an array of sub-wavelength antenna elements 301 with associated variable lumped impedance elements, $z_n$, 303 according to a simplified embodiment. As previously described, the sub-wavelength antenna elements 301 may have inter-element spacings that are substantially less than a free-space wavelength corresponding to an operating frequency or frequency range of the antenna system 300. For example, the inter-element spacings may be less than one-half or one-quarter of the free-space operating wavelength.

As shown, each of the sub-wavelength antenna elements 301 is associated with at least one lumped impedance element 303. A common TL 305 may be coupled to the sub-wavelength antenna elements via the lumped impedance elements and may be modeled as another lumped impedance element or may be incorporated based on the effects of the TL 305 or other common waveguide on each of the lumped impedance elements 303. Each lumped impedance element 303 may have a variable impedance value that is set during manufacture or that can be dynamically tuned via one or more control inputs. The 1:1 ratio of lumped impedance elements 303 and sub-wavelength antenna elements 301 is merely exemplary and other ratios are possible.

In some embodiments, the sub-wavelength antenna elements may be divided into two or more groups that are separated from one another by no more than half of an operating wavelength. Each group of sub-wavelength antenna elements may be spatially separated from each other group of sub-wavelength antenna elements by at least a distance exceeding that of half of an operating wavelength.

The separation of each group from each other may be greater than a Fraunhofer (far-field) distance associated with an aperture diameter of a largest of the at least two groups. In other embodiments, the separation from each group may be less than a Fraunhofer distance. In other embodiments, the separation of each group may be shorter than a diameter of a largest of the at least two groups or alternatively the separation distance may be associated with the free-space operation wavelength (e.g., longer, the same as, or shorter). In many embodiments, the individual elements and/or groups of elements may be in the reactive near-field of one another. The groups of sub-wavelength elements may be part of a receiver antenna element physically coupled to a receiver device.

The array of antenna elements 300 need not be planar as illustrated in FIG. 3A, though it may be. In some embodiments, two groups of sub-wavelength antenna elements are coplanar with one another and at least one other group is non-co-planar with the first two, co-planar groups.

Figure 3B:
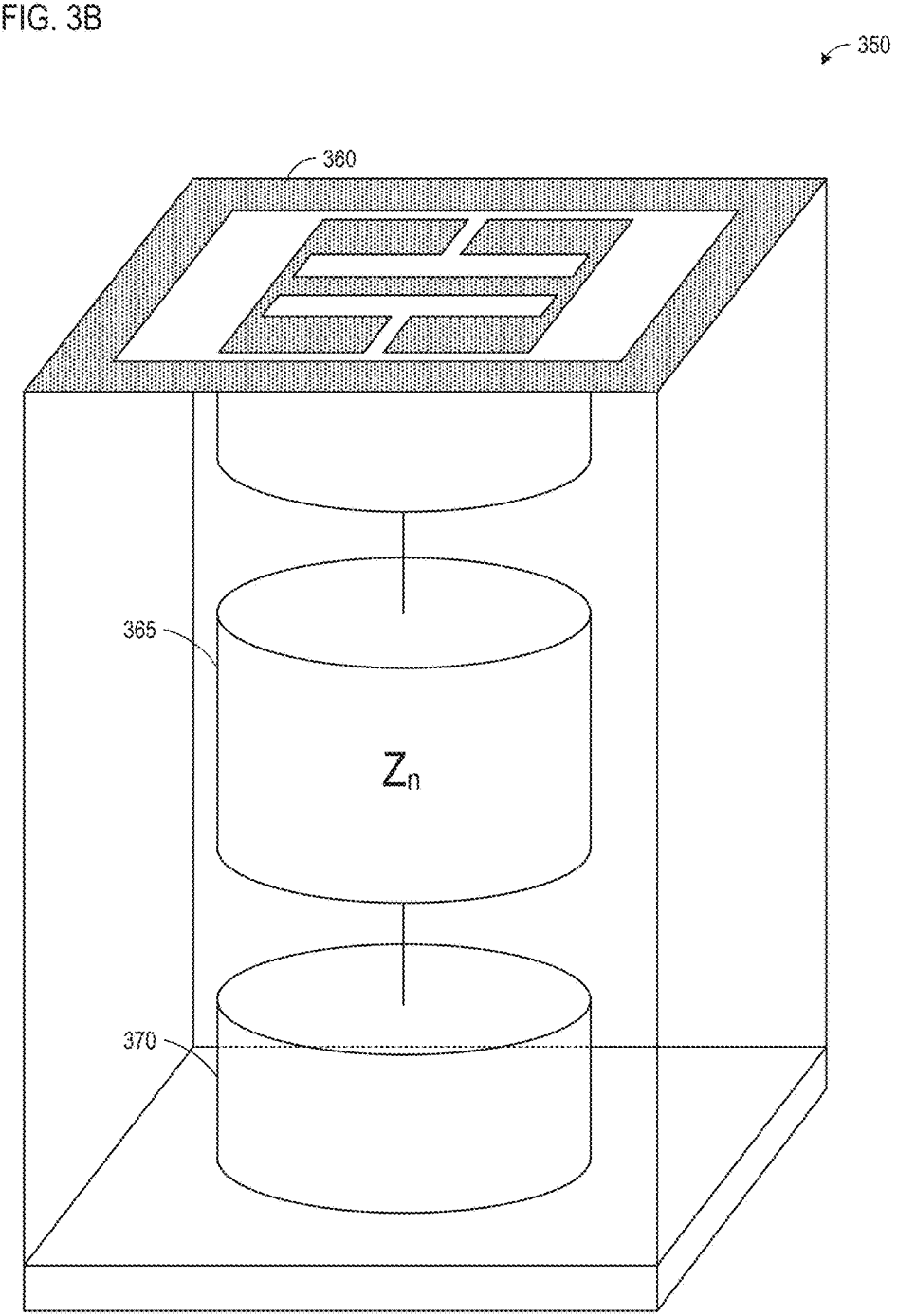
FIG. 3B illustrates a view of a conceptual model of a single sub-wavelength antenna element with an associated impedance element, according to one simplified embodiment.

FIG. 3B illustrates a close-up view 350 of a model of a single sub-wavelength antenna element 360 with an associated lumped impedance element, $z_n$, 365, and an impedance control input 370 that can be used to control or vary the impedance of the lumped impedance element, $z_n$, 365, according to one simplified embodiment.

Sub-wavelength antenna element 360 may be arranged in an array and may be configured for submersion in a fluid, such as fresh water, salt water, brackish water, or a particular gaseous environment.

Figure 4A:
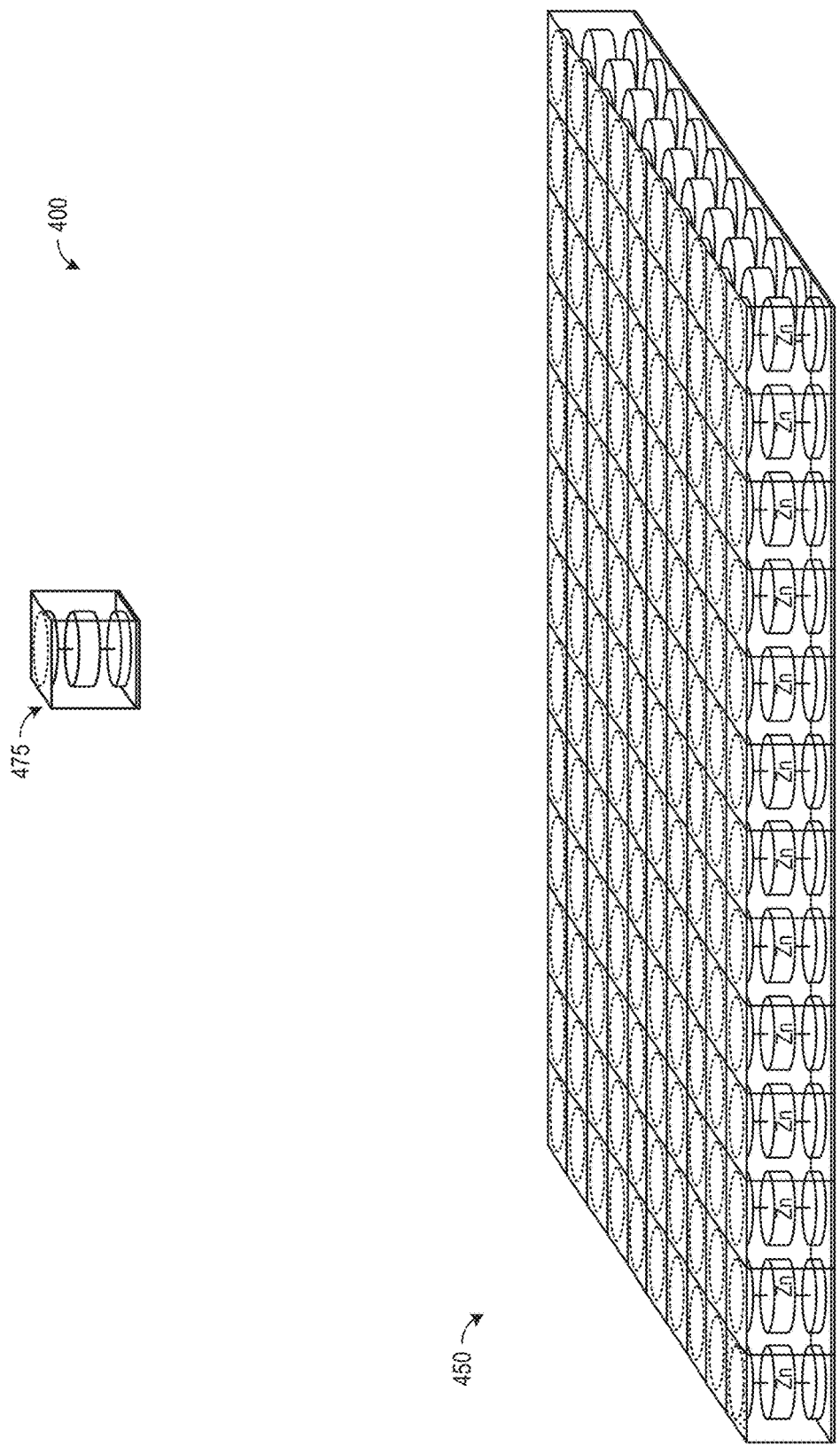
FIG. 4A illustrates an array of sub-wavelength antenna elements and associated variable impedance elements modeled as lumped ports, $N_a$, in an S-Matrix with a single external port, $N_e$, located physically external to the antenna system, according to one simplified embodiment.

FIG. 4A illustrates an array of sub-wavelength antenna elements 450 and associated variable lumped impedance elements with variable impedances $z_n$, modeled as lumped ports, $N_a$, in an S-Matrix with a single external port, $N_e$, 475 that is located physically external to the antenna system 450, according to one simplified embodiment.

In various embodiments, the modeled lumped external port, $N_e$, 475 may be associated with a variable impedance element, as illustrated. In some embodiments, the lumped external port, $N_e$, 475 is modeled as an external port with an infinitesimal volume located at a particular radius-vector relative to the antenna device. The lumped external port, $N_e$, 475 may be in the far-field of the antenna device, the radiative near-field of the antenna device, or the reactive near-field of the antenna device.

In some embodiments, the lumped external port, $N_e$, 475 may comprise a virtual port, an external region of space assumed to be a void, a region of space assumed to be filled with a dielectric material, and/or a location in space assumed to be filled with a conductive, radiative, reactive, and/or reflective material. In at least some embodiments, the lumped external port, $N_e$, 475 comprises or corresponds to the location of a receiving antenna or portion thereof.

Figure 4B:
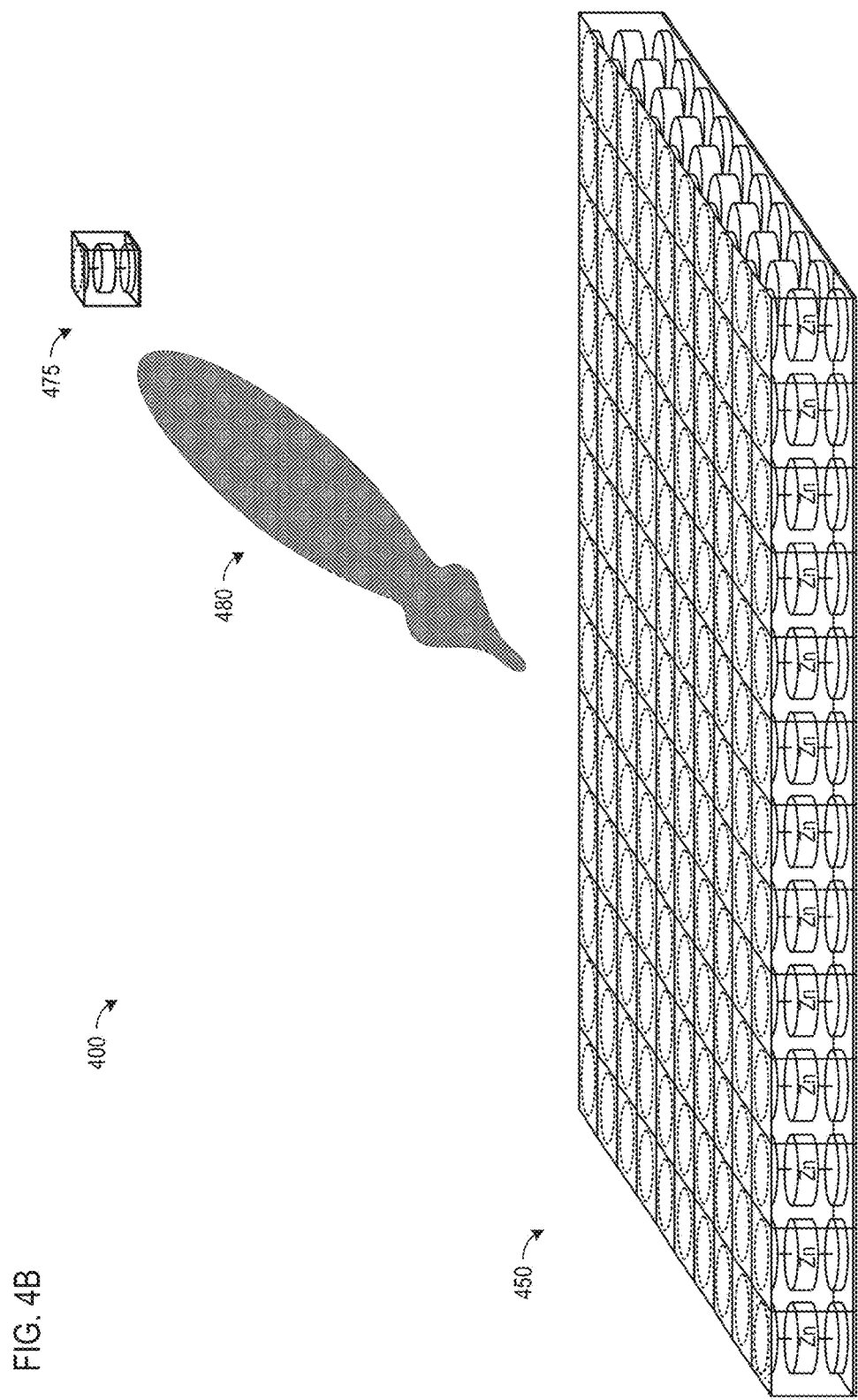
FIG. 4B illustrates a radiation pattern formed to maximize a field amplitude of an S-Matrix element associated with an external port, $N_e$, located physically external to the antenna system by adjusting the impedance values associated with each of the lumped ports, $N_a$, defined by the sub-wavelength antenna elements and associated impedance elements, according to one embodiment.

FIG. 4B illustrates a radiation pattern 480 formed to maximize a field amplitude of an S-Matrix element associated with an external port, $N_e$, 475 located physically external to the antenna system by adjusting the impedance values, $z_n$, associated with each of the lumped ports, $N_a$, defined by the sub-wavelength antenna elements and associated lumped impedance elements in the antenna system 450, according to one embodiment.

FIG. 4C illustrates a radiation pattern 480 formed to maximize a field amplitude of S-Matrix elements associated with two external ports, $N_e$, 475 located physically external to the antenna system and by minimizing the field amplitude of three other external ports, $N_e$, 476 according to one embodiment.

FIG. 5A illustrates an antenna system 550 comprising an array of sub-wavelength antenna elements and associated variable impedance lumped elements with two intended targets 590 and 595 for radiation patterning.

Figure 5B:
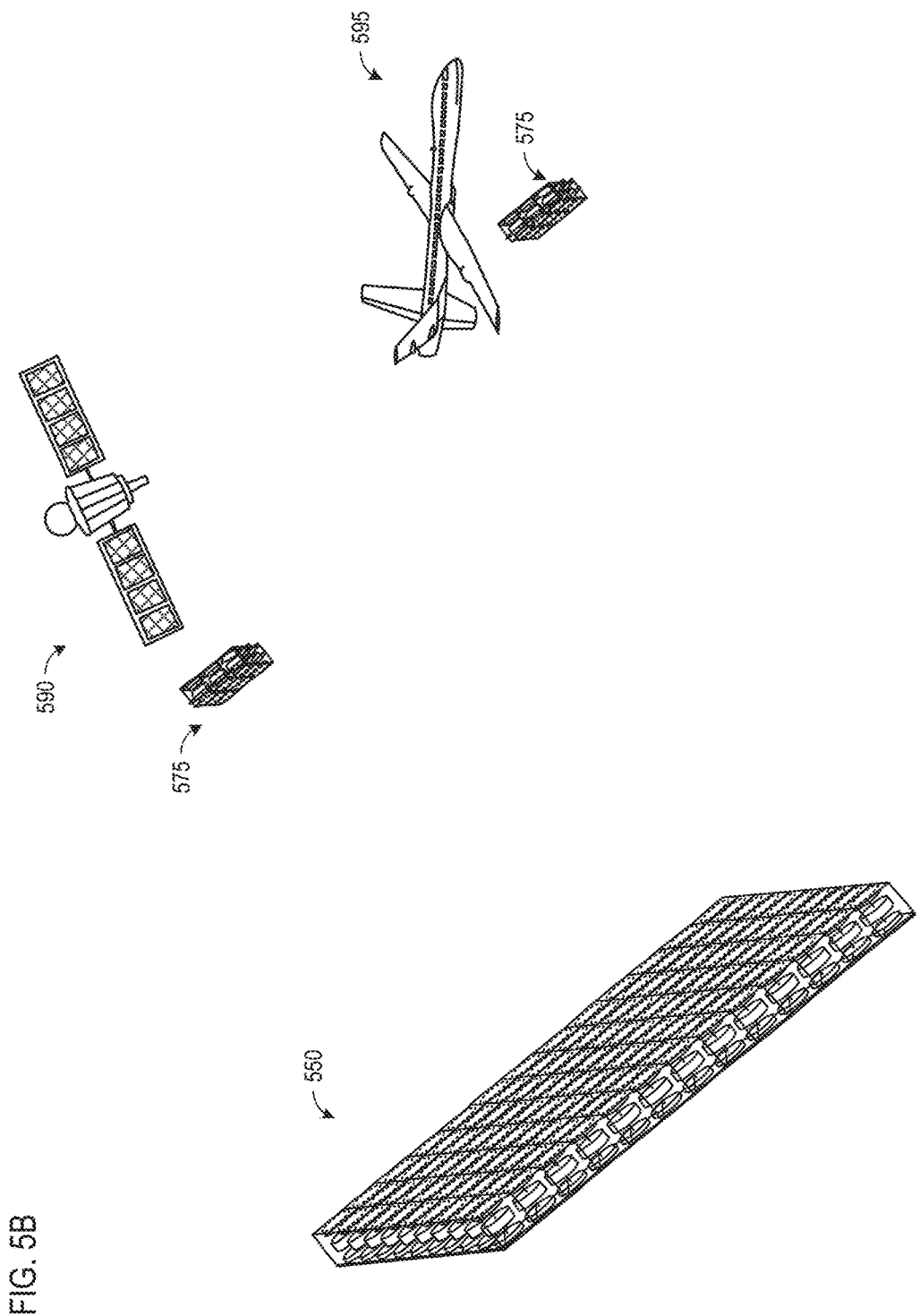
FIG. 5B illustrates one embodiment showing the modeling of the antenna system in an S-Matrix of field amplitudes of a plurality of ports, N, including lumped antenna ports, $N_a$, and two lumped external ports, $N_e$.

FIG. 5B illustrates an embodiment showing the modeling of the antenna system in an S-Matrix of field amplitudes of a plurality of ports, N, including lumped antenna ports, $N_a$, of the sub-wavelength antenna elements and associated variable impedance elements 550 and two lumped external ports, $N_e$, 575.

As previously described, multiple beams can be formed simultaneously or in switch-mode by considering M output ports (e.g., the two different external ports, $N_e$, 575) located in different directions and potentially very distant from one another. The size of the system matrices that must be optimized may then correspond to N=Na+M+1, but again, this does not change the general course of the algorithm nor does this increase the complexity exponentially.

As previously discussed, approximate nulls of the field can be formed, either in the far-field or near-field, by considering a minimization problem for the rational functions described in detail above. To attain a specific target radiation patter, a required level of sidelobe suppression can be attained by maximizing the function $F=|S_{1,N}|^2-\alpha|S_{1,N+1}|^2$ where the $N^{th}$ port measures the field intensity in one direction, the (N+1) port measures field intensity in a specified sidelobe direction, where a is a selectable weight coefficient reflecting the degree to which sidelobe suppression should be achieved.

Figure 5C:
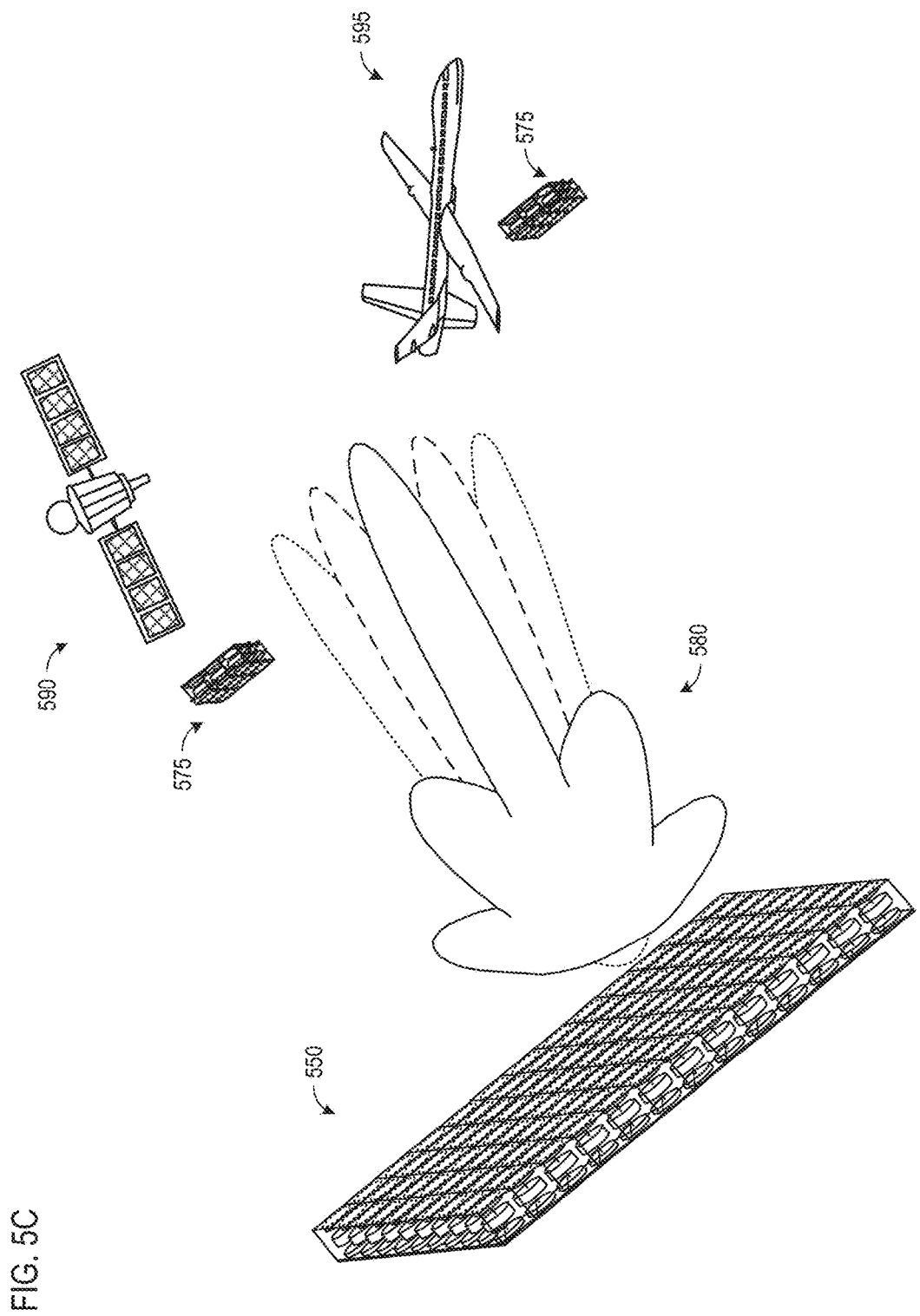
FIG. 5C graphically illustrates the results of adjusting one or more variable impedance control inputs to modify one or more impedance values of one or more of the variable impedance elements to attain a desired radiation pattern, according to one embodiment.

FIG. 5C graphically illustrates the results of adjusting one or more variable impedance control inputs to modify one or more impedance values of one or more of the variable lumped impedance elements associated with the sub-wavelength antenna elements of the antenna system 550 to attain a desired radiation pattern 580 based on the two lumped external ports, $N_e$, 575, and the associated targets 590 and 595.

Figure 6:
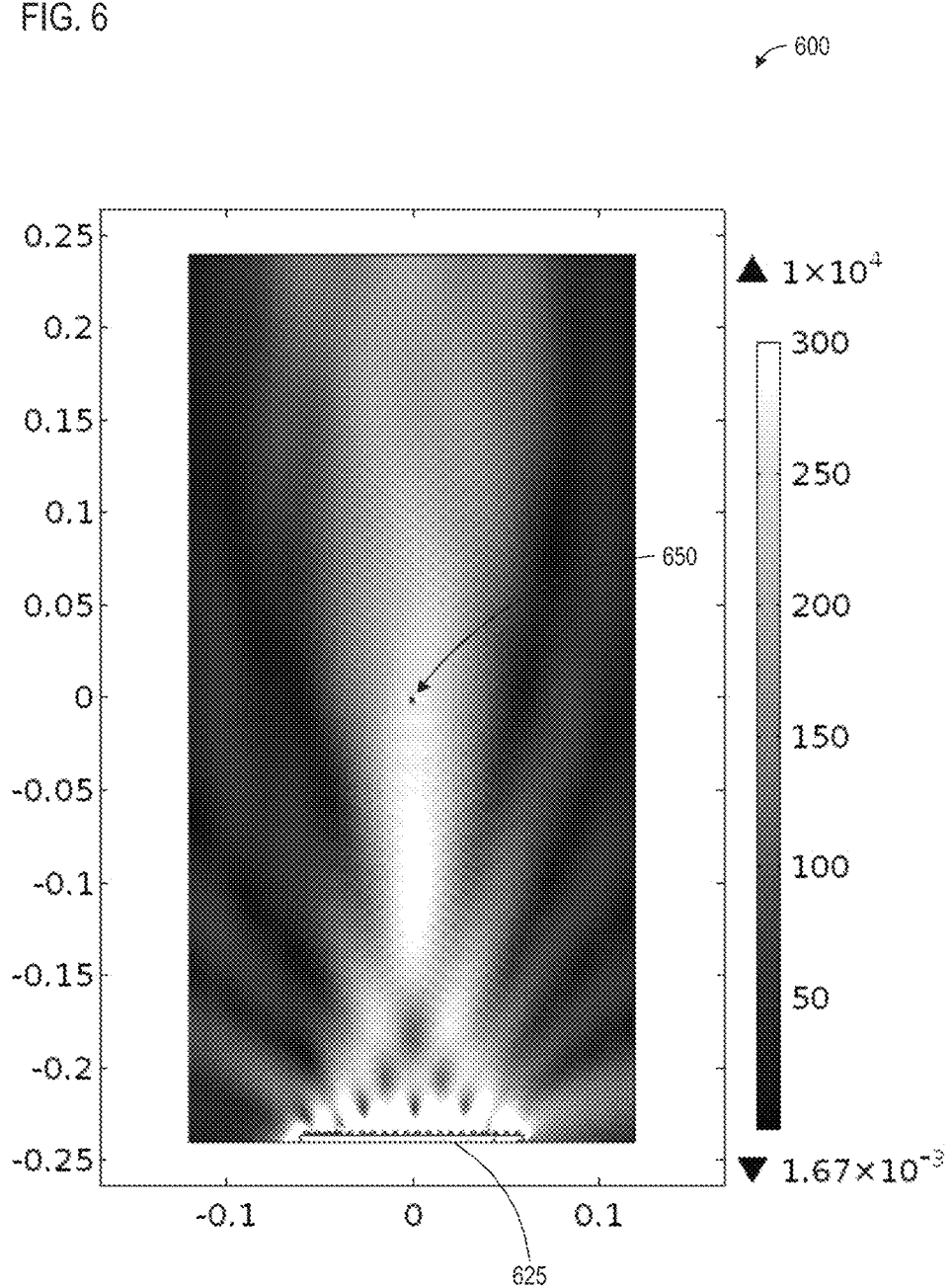
FIG. 6 illustrates an edge-fed metamaterial surface antenna for wireless power transfer transmitting a convergent beam to an electrically small antenna, according to one embodiment.

FIG. 6 illustrates an edge-fed metamaterial surface antenna 625 for wireless power transfer transmitting a convergent beam 600 to an electrically small antenna 650, according to one embodiment. Gaussian beamforming can generally be understood as a generalization of the holographic beamforming techniques described above. Accordingly, many of the same features, variations, approaches, equations, and/or calculations may be applicable to Gaussian beamforming.

The illustrated edge-fed metamaterial surface antenna 625 may, as an example, be four wavelength wide. The width of the beam near the electrically small antenna 650 may be approximately two wavelengths wide. The holographic Gaussian beamforming techniques described herein allow for beams with a minimum waist size that is substantially smaller than the transmitting aperture diameter. Such convergent beams may only be possible within the Fraunhofer distance of the transmitter, where the Fraunhofer distance, $D_{Fr}$, is defined as: $D_{Fr}=2D^2/\lambda$, where D represents the aperture diameter of the transmitter and $\lambda$ represents the wavelength. The region within the Fraunhofer distance of the transmitter may be referred to as the radiative near-field (RaNF).

Figure 7:
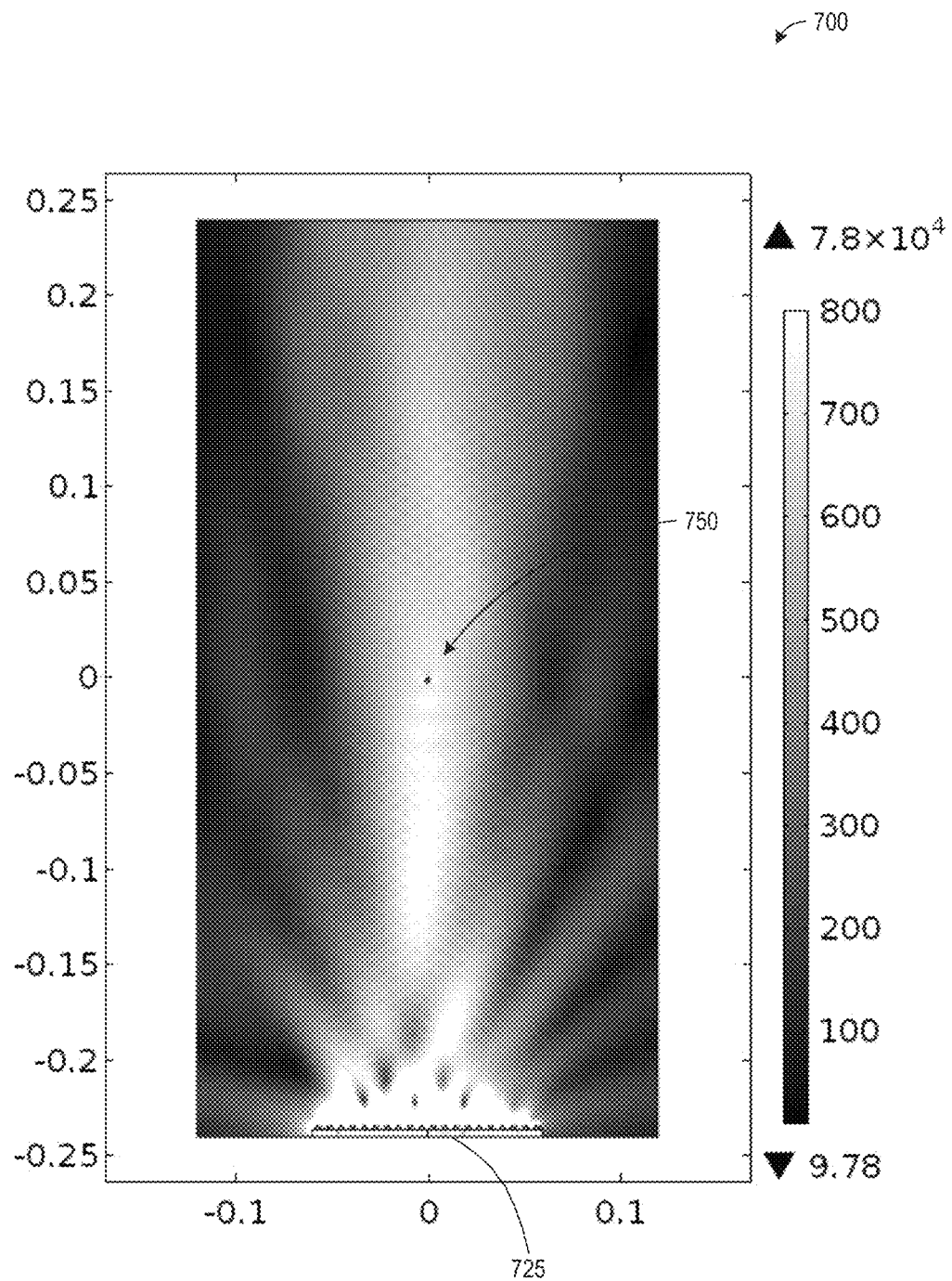
FIG. 7 illustrates a center-fed metamaterial surface antenna for wireless power transfer transmitting a convergent beam to an electrically small antenna, according to another embodiment.

FIG. 7 illustrates a center-fed metamaterial surface antenna 725 for wireless power transfer transmitting a convergent beam 700 to an electrically small antenna 750, according to another embodiment. The center-fed metamaterial surface antenna 725 illustrates a narrow-waist beam transmitted from a transmitter for wireless power transfer. For both center- and edge-fed metamaterial surface antennas (e.g., 625 and 725), the relationship between minimum waist size, transmitter size, and transmission distance may be described as: $D_{max}=D_{Tx}D_{Rx}/\lambda$, where $D_{max}$ is the maximum transfer distance at which a receiver with an aperture diameter, $D_{Rx}$, that corresponds to the minimum waist diameter can be used with a receiver with an aperture diameter, $D_{Tx}$, can be used for a given wavelength, $\lambda$. Thus for distances up to $D_{max}$, power transmission can be attained with 50-90% efficiency.

As an example, for $\lambda=3$ mm (100 GHz) and a receiver with an aperture diameter of 30 cm, the maximum transfer distance, $D_{max}$, would be 100 multiplied by the transmitter aperture diameter, $D_{Tx}$. Thus, a transmitter with an aperture diameter of one meter could efficiently transmit up to 100 meters.

Figure 8A:
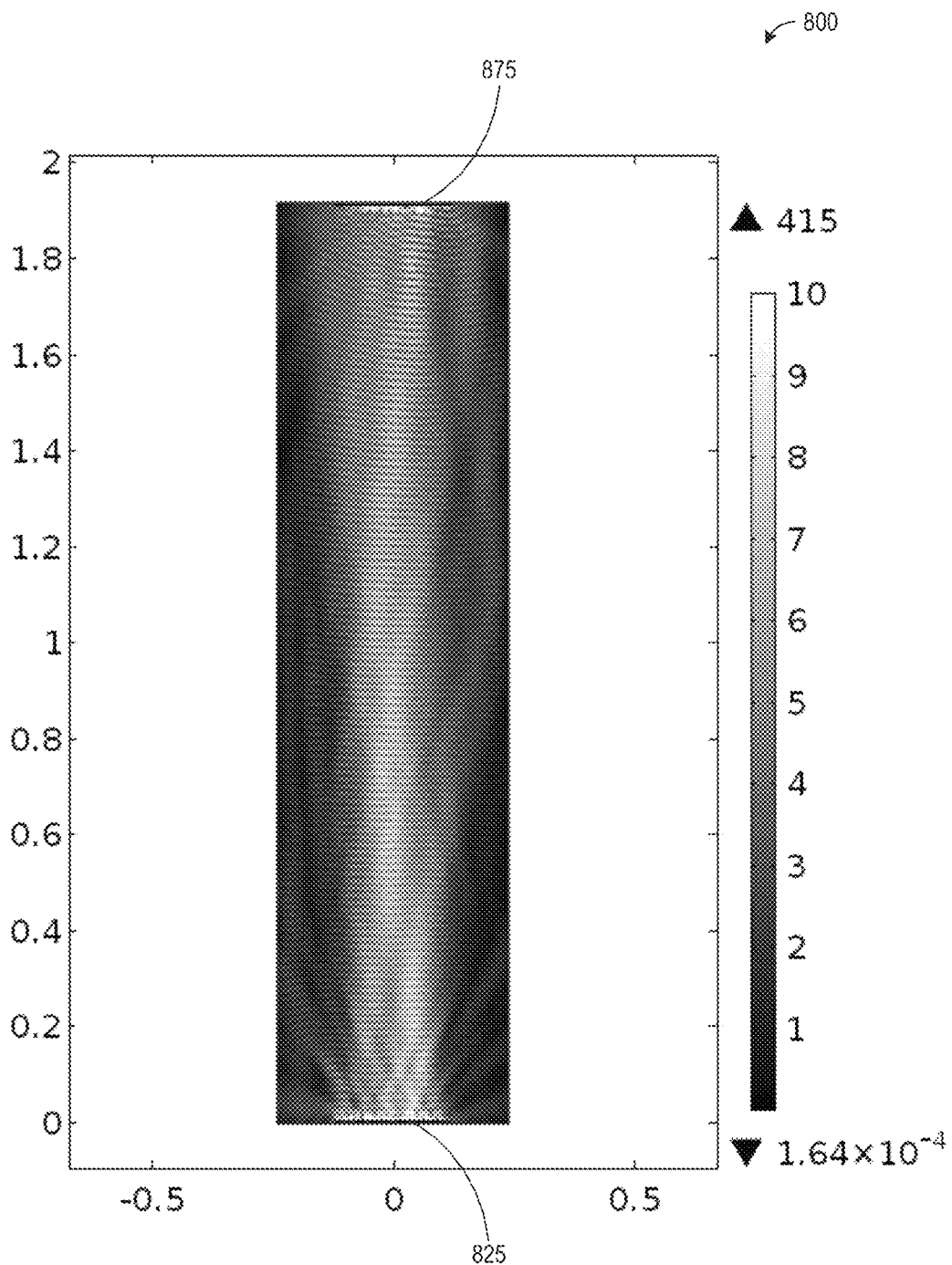
FIG. 8A illustrates a metamaterial surface antenna wireless power transmission system with utilizing two center-fed metamaterial surface antennas (one as a transmitter and one as a receiver) with a transfer efficiency approximating 100% at one-half of the Fraunhofer distance.

FIG. 8A illustrates a metamaterial surface antenna wireless power transmission system with utilizing two center-fed metamaterial surface antennas (one as a transmitter 825 and one as a receiver 875) with a transfer efficiency approximating 100% at one-half of the Fraunhofer distance. At one half of the Fraunhofer distance, the beam waist is approximately equal to the transmitter 825 diameter and the receiver 875 diameter of approximately the same size can be used to intercept nearly 100% of the transmitted power. As the transfer distance between the transmitter 825 and the receiver 875 increases to the Fraunhofer distance, the minimum achievable beam 800 waist approaches the far-field estimate which is roughly $D^2/\lambda$. Thus, for a fixed size receiver, efficiency decreases with the inverse square of the distance as is understood with far-field transmission.

Figure 8B:
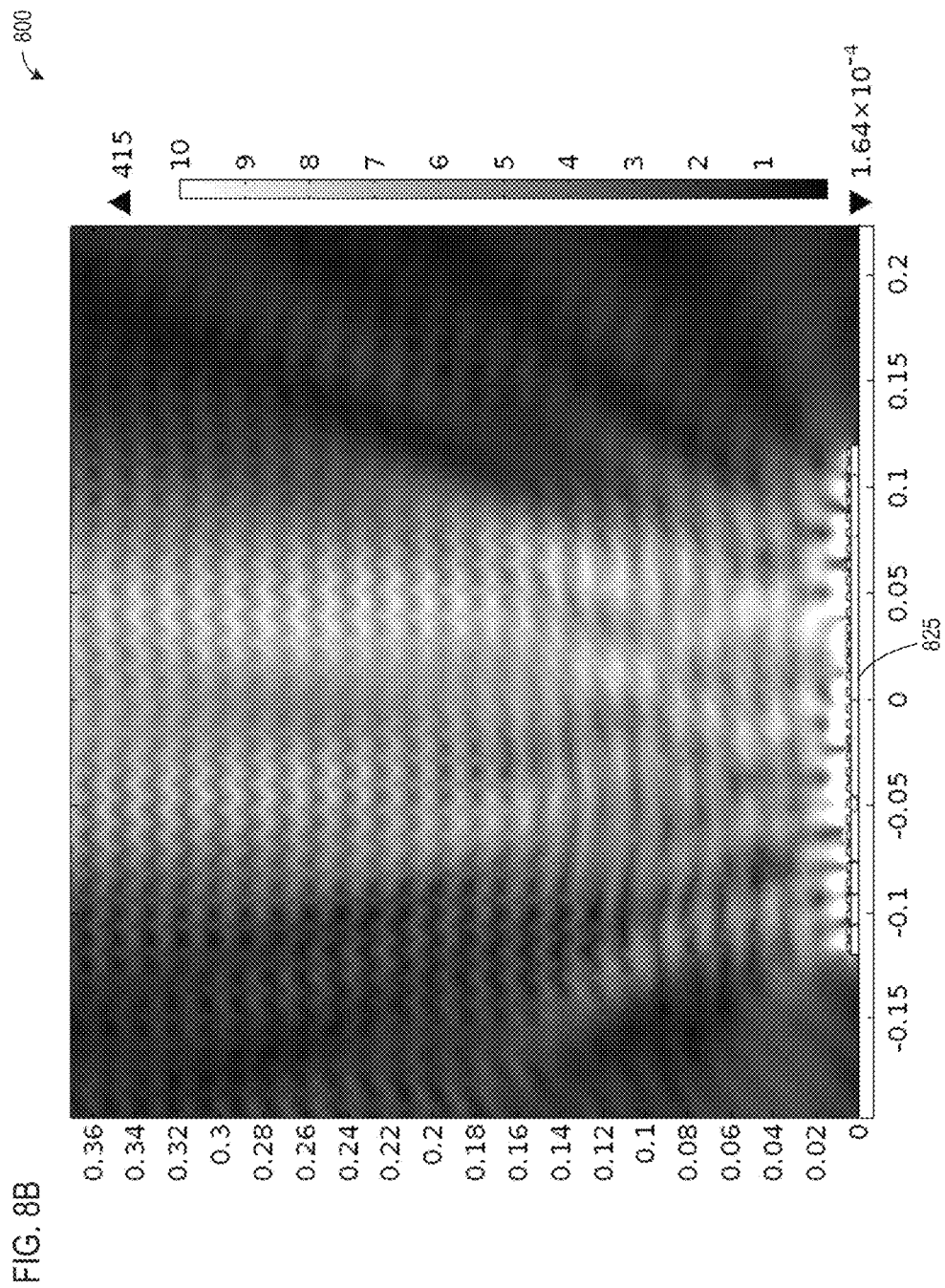
FIG. 8B illustrates a zoomed in view of the transmitter of the metamaterial surface antenna wireless power transmission system.

FIG. 8B illustrates a zoomed in view of the transmitter 825 of the metamaterial surface antenna wireless power transmission system 800. The illustrated embodiment is approximately eight free-space wavelengths, $\lambda$, in diameter. The illustrated embodiment is simulated with 32 unit cells, with one tunable lumped element per cell, making the array pitch $\lambda/4$. As the Fraunhofer distance may be simply defined as $2*D^2/\lambda$, one half of the Fraunhofer distance can be expressed as $D^2/\lambda$. As the diameter of the transmitter 825 is $8*\lambda$, the transfer distance amounts to $(8*\lambda)^2/\lambda$, which is equal to $64\lambda$. Described in terms of antenna aperture, the transfer distance equals eight antenna diameters.

Generally, the laws of diffraction limits the minimum possible beam waist to about half-wavelength. To achieve Gaussian beams with the tightest possible waists, the spatial Fourier spectrum of the radiated mode must contain transverse wavenumbers close to maximum free space number, and the spectrum must be accurately sampled.

Figure 9A:
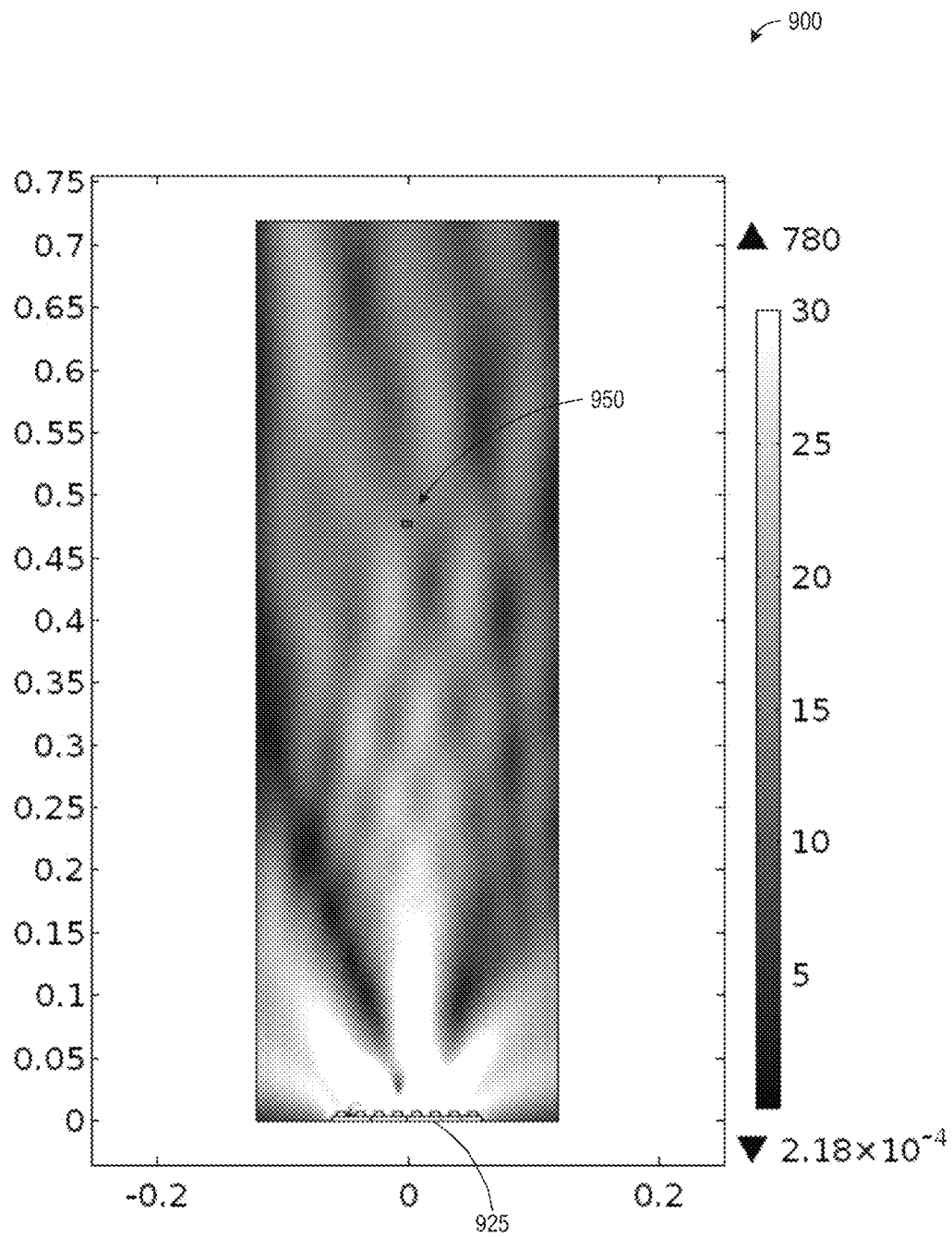
FIG. 9A illustrates a relatively inefficient metamaterial surface antenna with two sub-wavelength antenna elements per wavelength attaining a resolution similar to a conventional phases array.
Figure 9B:
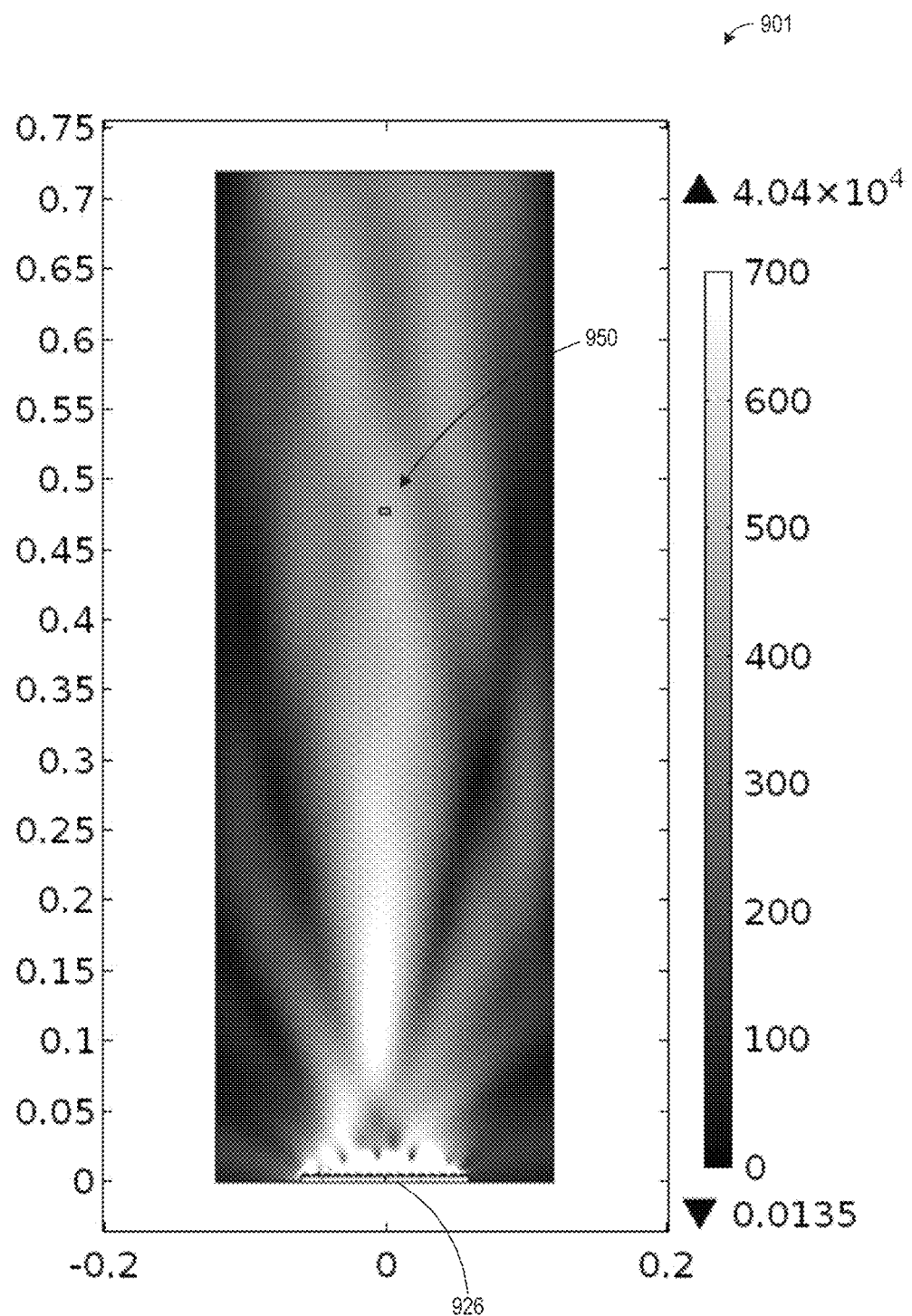
FIG. 9B illustrates a more efficient metamaterial surface antenna with four sub-wavelength antenna elements per wavelength attaining an improved resolution for a more efficient wireless power transfer.
Figure 9C:
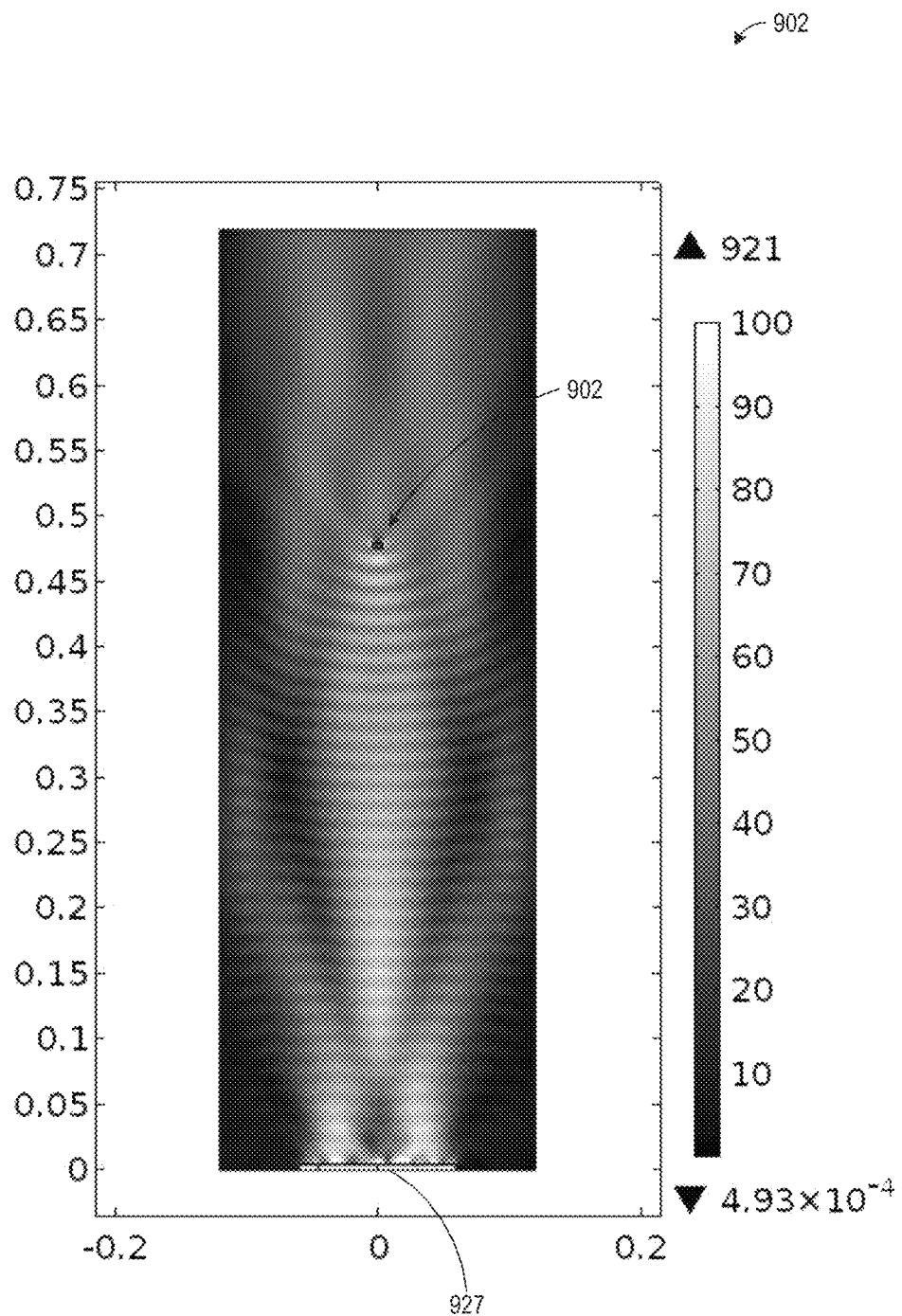
FIG. 9C illustrates an even more efficient metamaterial surface antenna with eight sub-wavelength antenna elements per wavelength attaining even greater resolution for improved wireless power transfer.

In FIGS. 9A-9C, the number of radiating elements of the metamaterial surface transmitter is shown with two, four, and eight radiating elements. As illustrated in FIG. 9A, a transmitter 925 with only two elements creates a relatively inefficient metamaterial surface antenna that is only able to attain a resolution similar to that of a conventional phases array. The waist size of the transmitted beam 900 at the receiver 950 is relatively wide.

FIG. 9B illustrates a more efficient metamaterial surface antenna 926 with four sub-wavelength antenna elements per wavelength attaining an improved resolution 901 for a more efficient wireless power transfer to the receiver 950.

FIG. 9C illustrates an even more efficient metamaterial surface antenna 927 with eight sub-wavelength antenna elements per wavelength attaining even greater resolution 902 for improved wireless power transfer to the receiver 950.

Figure 10A:
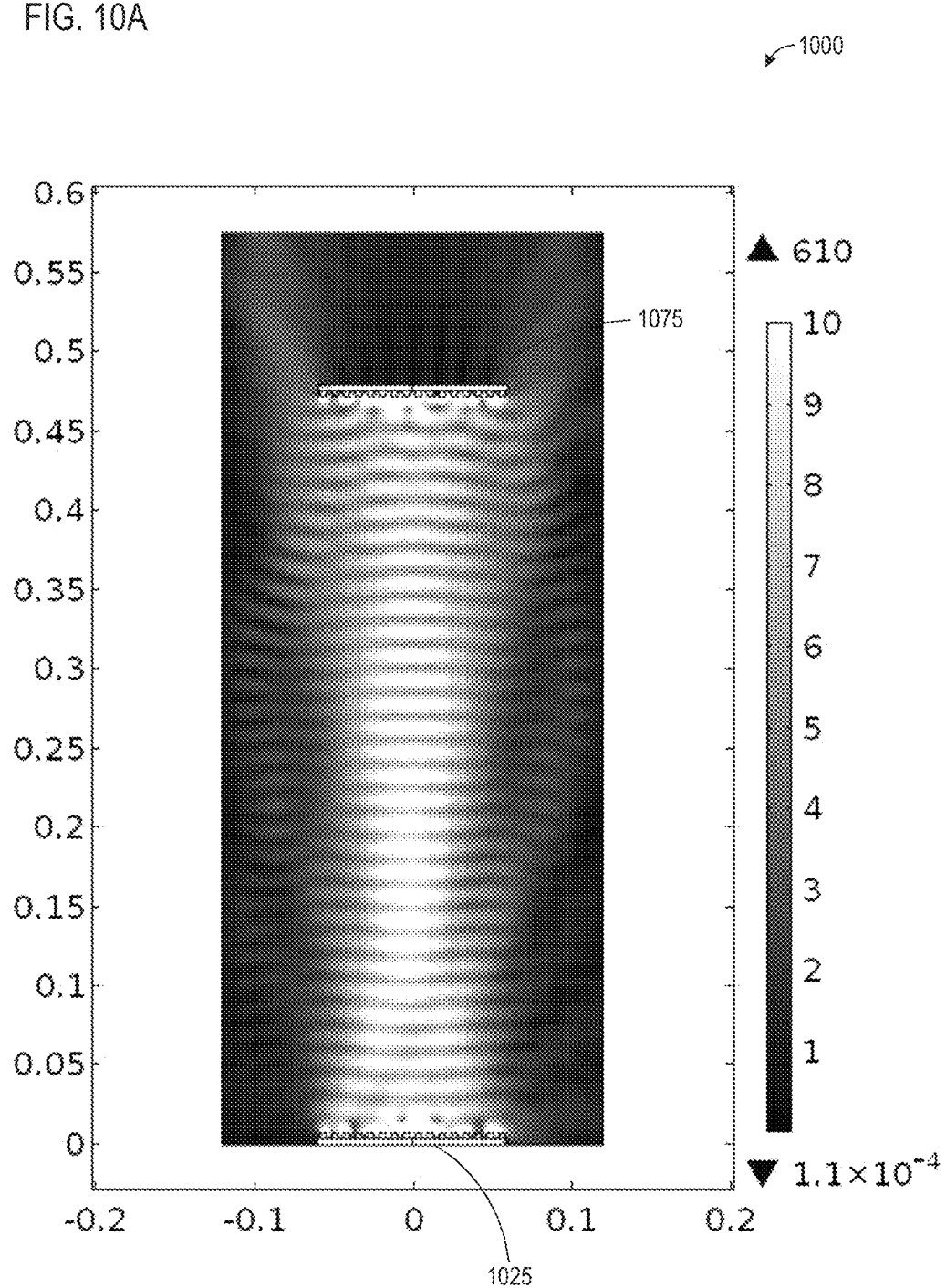
FIG. 10A illustrates two relatively low-density metamaterial surface antennas used as a transmitter and a receiver in a wireless power transmission system.

FIG. 10A illustrates two relatively low-density metamaterial surface antennas 1025 and 1075. A beam 1000 transmitted from the transmitter 1025 to the receiver 1075 of the wireless power transmission system is efficiently collected. In the illustrated embodiment, both the transmitter 1025 and the receiver 1075 are center-fed and the transfer occurs within the Fraunhofer distance.

Figure 10B:
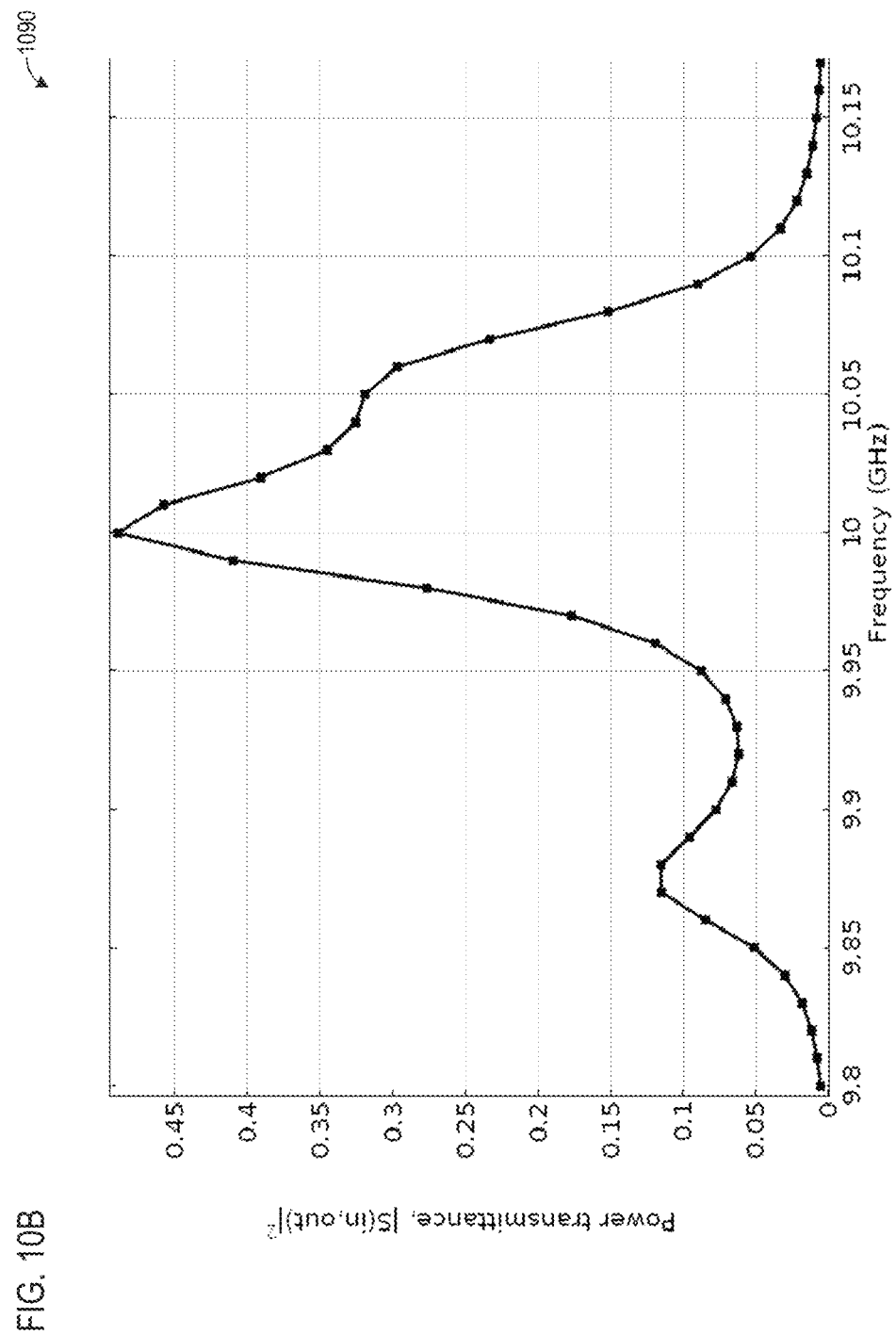
FIG. 10B illustrates a graph of power transmittance for a range of frequencies using the relatively low-density metamaterial surface antenna wireless power transmission system, according to one embodiment.

FIG. 10B illustrates a graph 1090 of power transmittance for a range of frequencies using the relatively low-density metamaterial surface antenna wireless power transmission system, according to one embodiment.

Figure 11A:
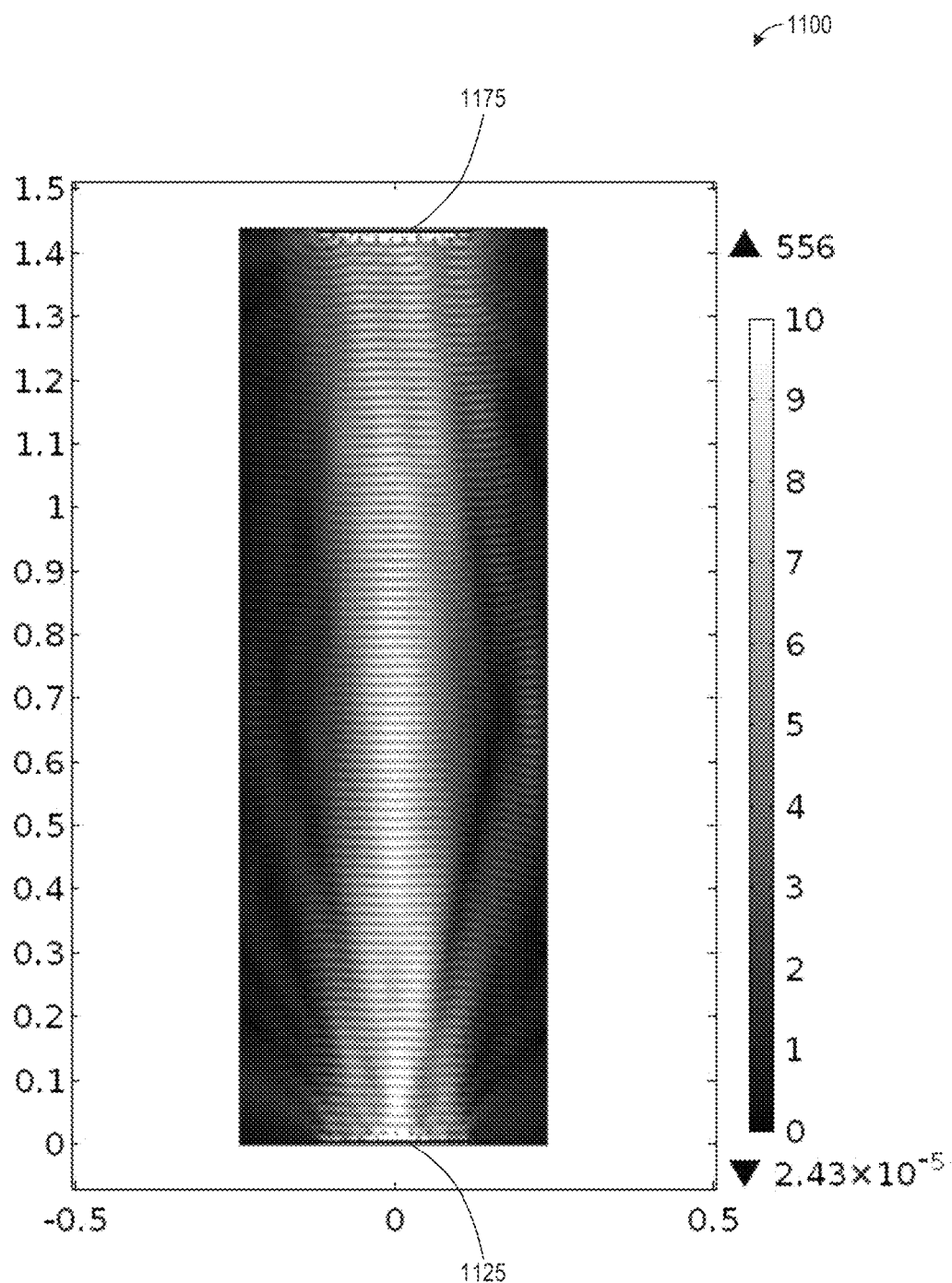
FIG. 11A illustrates two relatively high-density metamaterial surface antennas being used as transmitter and receiver in a wireless power transmission system.
Figure 11B:
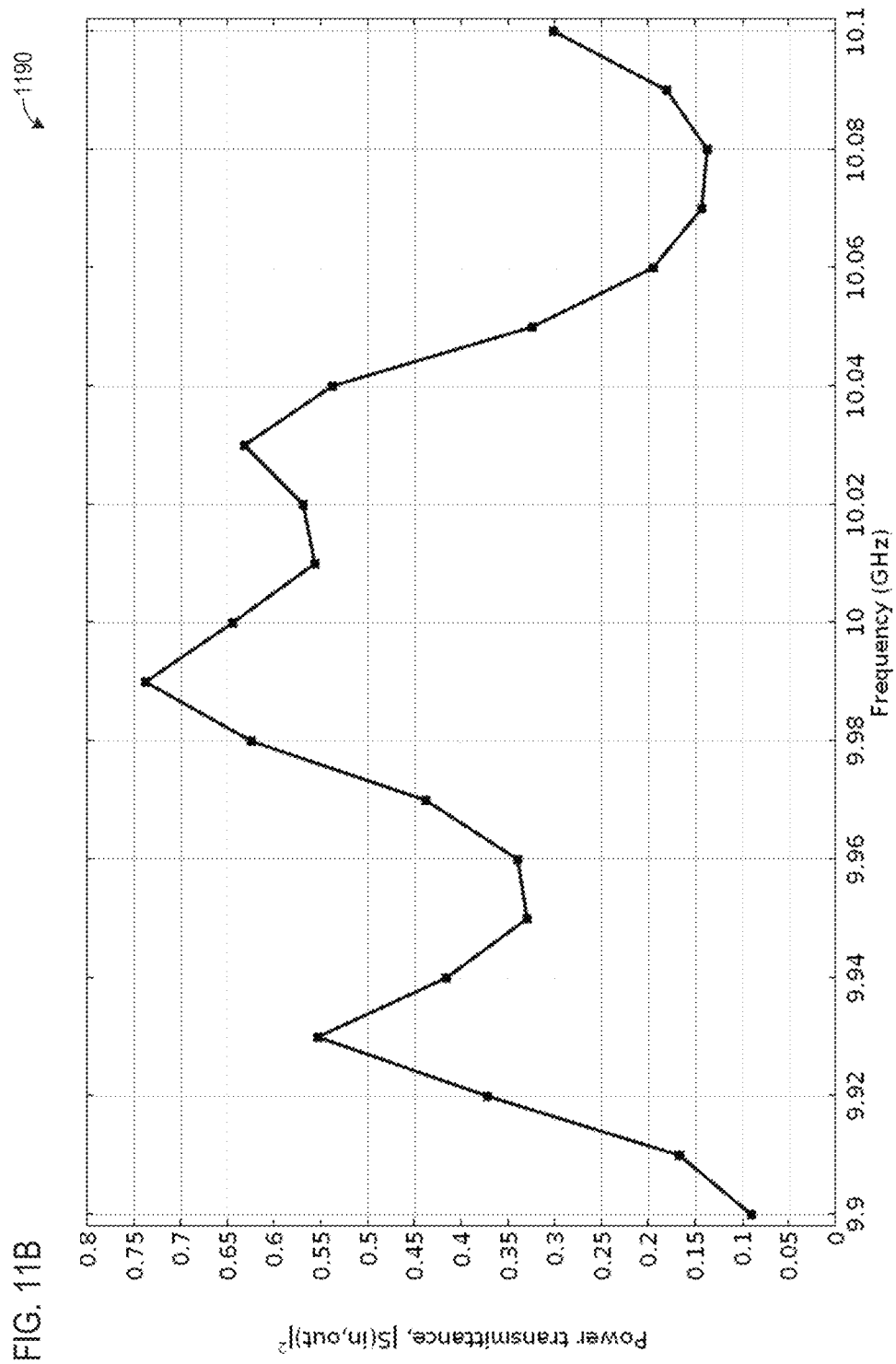
FIG. 11 B illustrates a graph of improved power transmittance for a range of frequencies using the relatively high-density metamaterial surface antenna wireless power transmission system, according to another embodiment.

FIG. 11A illustrates two relatively high-density metamaterial surface antennas 1125 and 1175 being used as transmitter 1125 and receiver 1175 in a wireless power transmission system. The wireless power transfer via the illustrated beam 1100 occurs within the Fraunhofer distance. As shown in the graph 1190 of FIG. 11B, an improved power transmittance is possible for a range of frequencies using relatively high-density metamaterial surface antennas, according to various embodiment.

Figure 12:
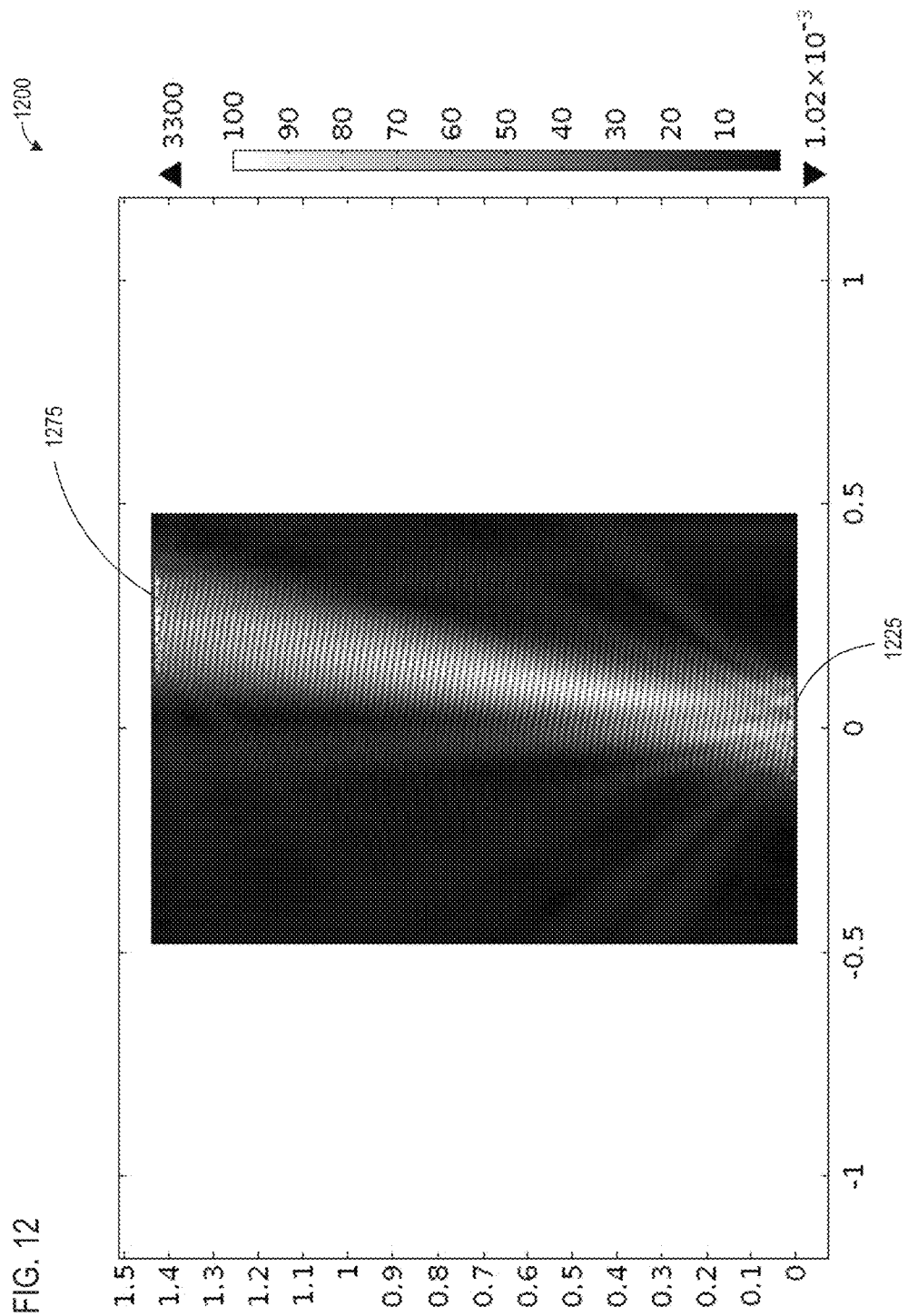
FIG. 12 illustrates a steerable metamaterial surface antenna wireless power transmission system, according to one embodiment.

FIG. 12 illustrates a steerable metamaterial surface antenna wireless power transmission system, according to one embodiment. As illustrated, the beam 1200 can be transmitted at an angle relative to the normal of the transmitter 1225 and the receiver 1275. The ability dynamically modify the angle at which the beam 1200 is transmitted to the receiver 1275, without requiring the angle of either the transmitter 1225 or the receiver 1275 to move, allows for efficient wireless power transfer to moving objects and devices.

Figure 13A:
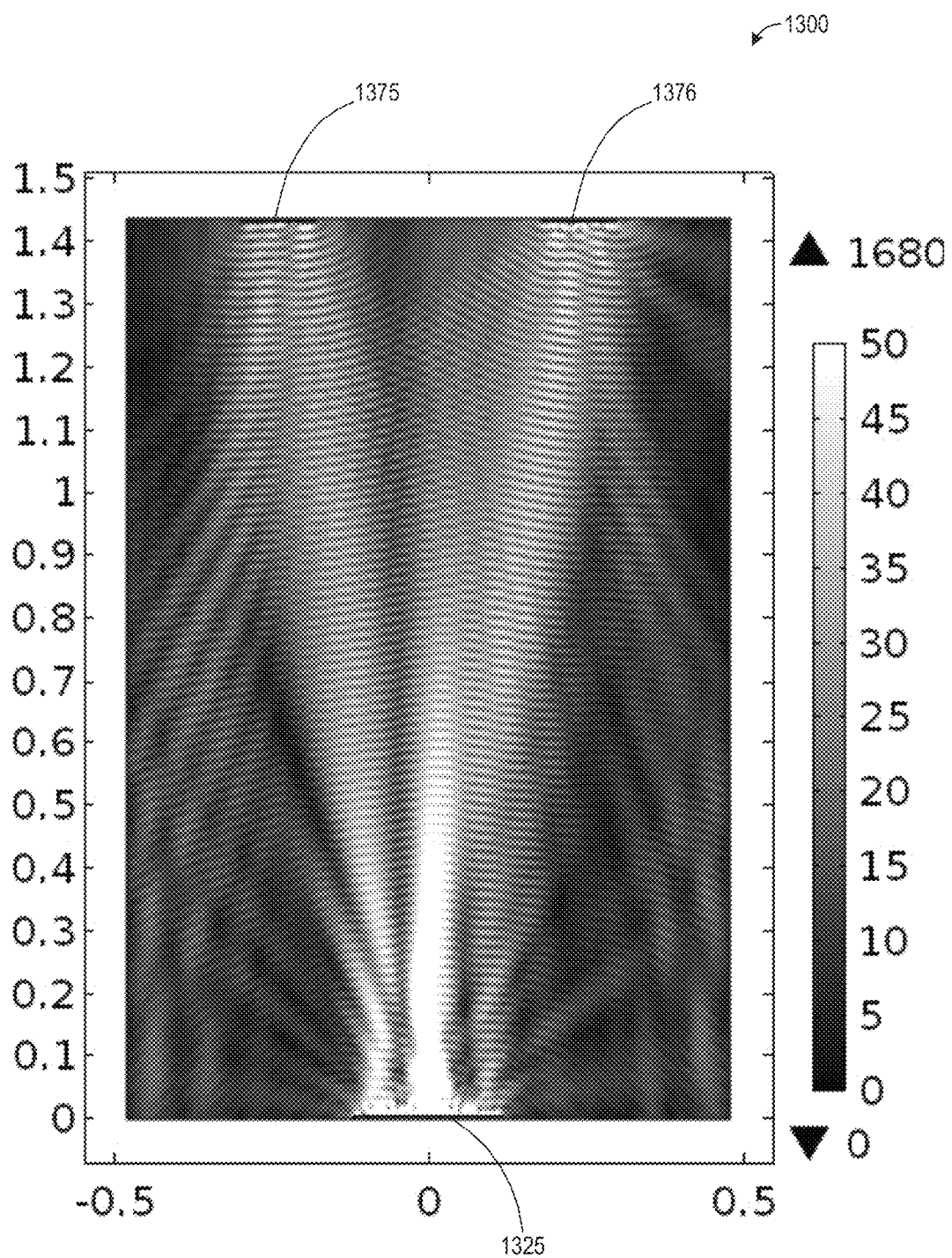
FIG. 13A illustrates a graph of a metamaterial surface antenna wireless power transmission system with one metamaterial surface antenna acting as a transmitter and two metamaterial surface antennas acting as receivers, according to one embodiment.

FIG. 13A illustrates a graph of a metamaterial surface antenna wireless power transmission system with one metamaterial surface antenna acting as a transmitter 1325 and two metamaterial surface antennas acting as receivers 1375 and 1376, according to one embodiment. In some embodiments, the transmitter may transmit 50% of the power via split beams 1300 to each receiver 1375 and 1376. In alternative embodiments, the distribution of power may vary based on need, capabilities of both receivers, and/or various economic reasons.

Figure 13B:
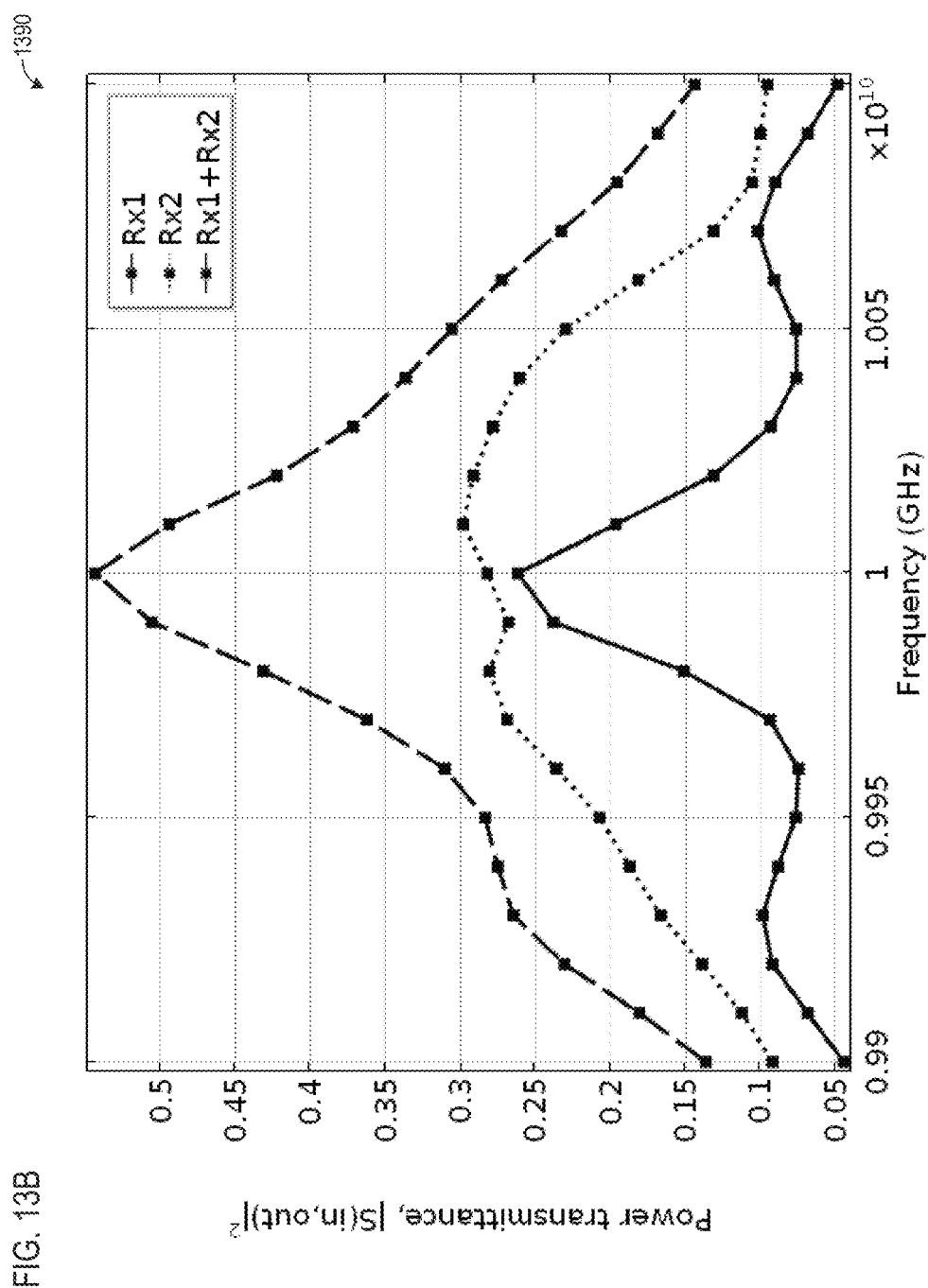
FIG. 13B illustrates a graph of power transmittance relative to frequency for the dual receiver wireless power transmission system of FIG. 13A, according to one embodiment.

FIG. 13B illustrates a frequency-normalized graph of power transmittance for the dual receiver wireless power transmission system of FIG. 13A, according to one embodiment. As illustrated, the power received by each receiver 1375 and 1376 adds up to nearly 100%.

Figure 14:
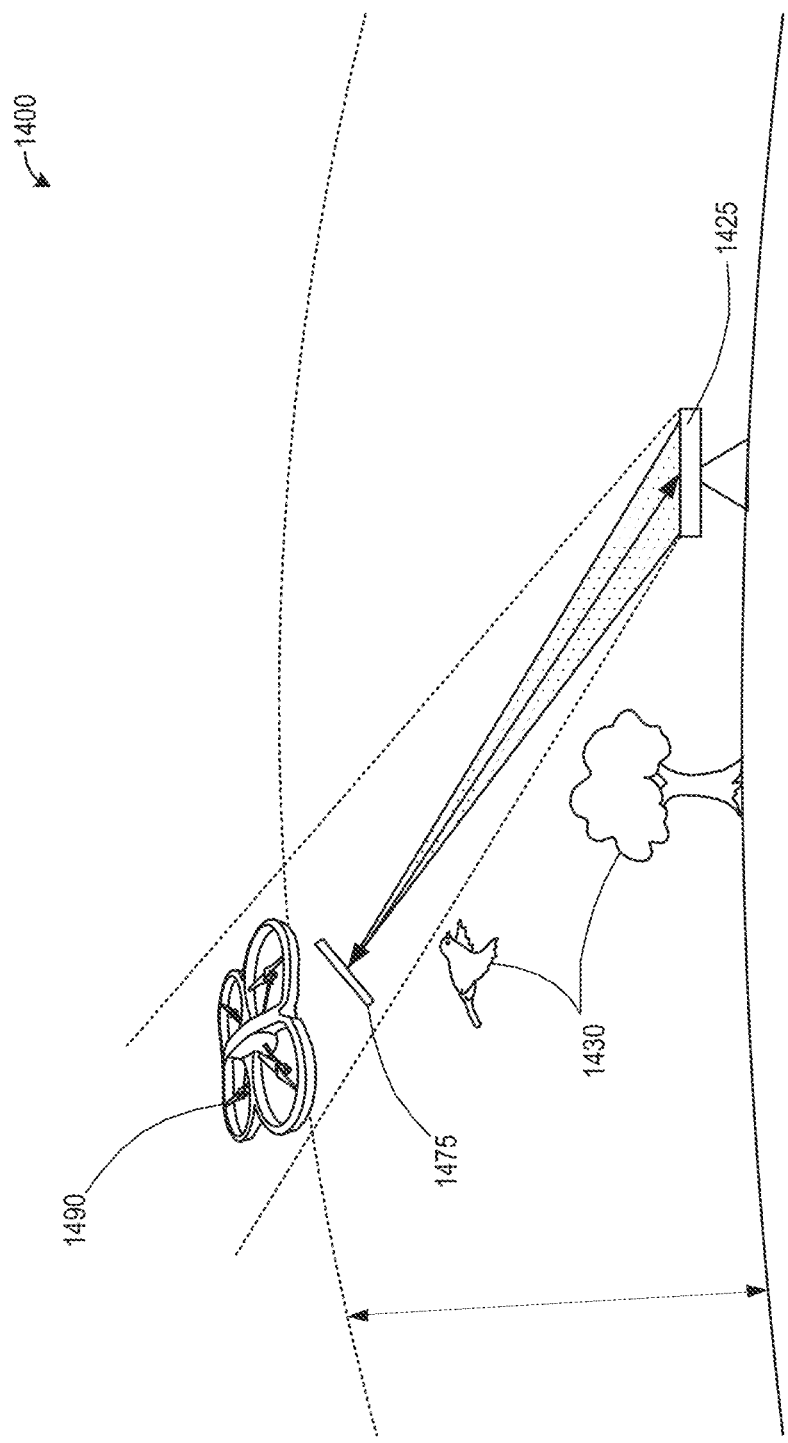
FIG. 14 illustrates an examples of unmanned aerial vehicle being wirelessly powered using a metamaterial surface antenna, according to one example embodiment.

FIG. 14 illustrates an examples of wireless power transfer system 1400 used to power an unmanned aerial vehicle 1490. The wireless power transfer system 1400 may include a metamaterial surface antenna transmitter 1425 that can transmit a relatively narrow beam to a metamaterial surface antenna receiver 1475. The beam may provide sufficient power to instantaneously power a motor of the unmanned aerial vehicle 1490. Alternatively, the beam may provide power that is used to charge batteries or a capacitor of the unmanned aerial vehicle 1490. The transmitter may automatically track the location of the unmanned aerial vehicle 1490 to ensure that the beam direction is correct. The location of the unmanned aerial vehicle 1490 may be provided to the wireless power transfer system 1400 through a third device configured to track location and/or based on real-time feedback from the unmanned aerial vehicle 1490. Zones of exclusion may be utilized by the wireless power transfer system to increase side-lobe suppression and/or otherwise not oversaturate certain zones in the environment. For example, it may be desirous to limit the power density that contacts the bird and/or tree 1430.

Figure 15:
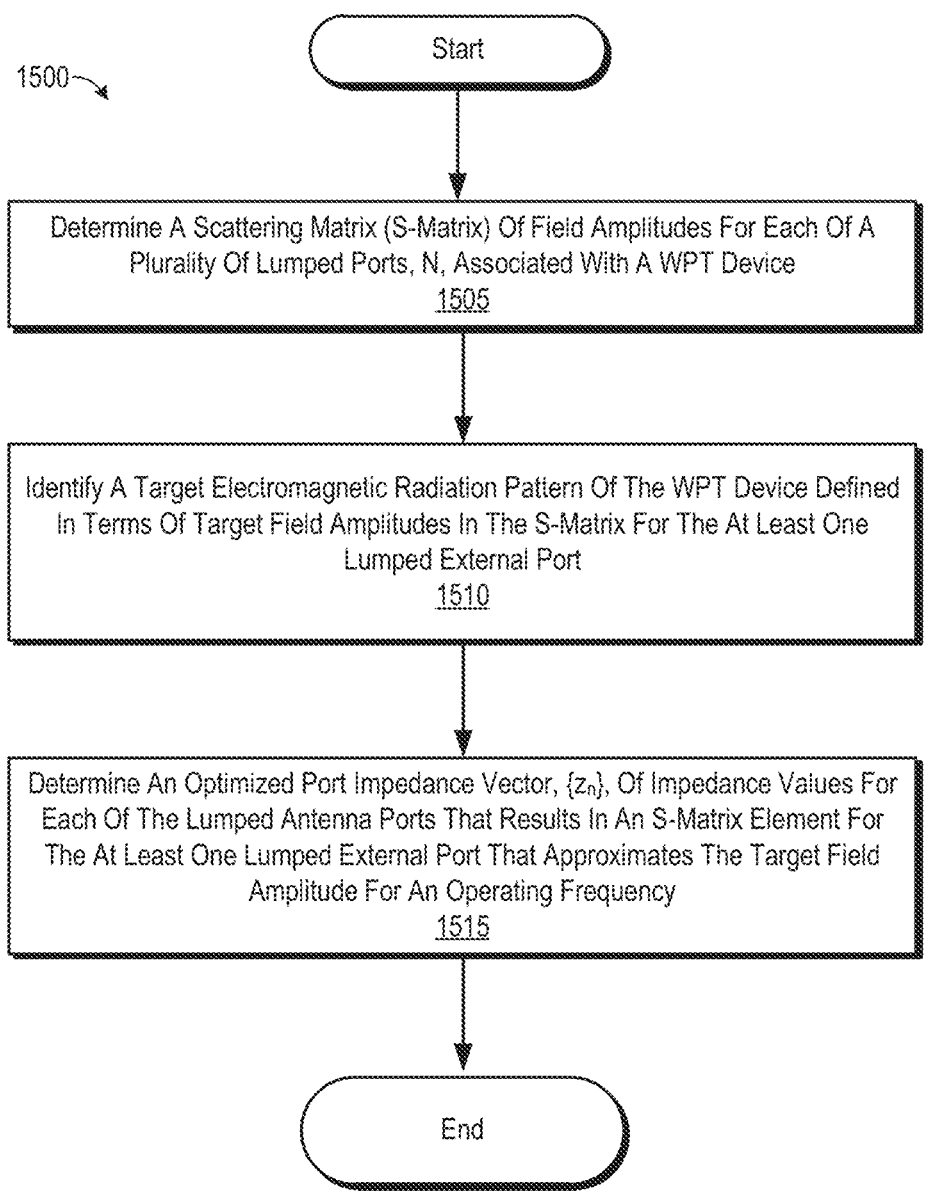
FIG. 15 is a flow chart of a wireless power transfer method utilizing at least one metamaterial surface antenna, according to various embodiments.

FIG. 15 is a flow chart of a wireless power transfer method 1500 utilizing at least one metamaterial surface antenna, according to various embodiments. The method illustrated may be computer-implemented via software, hardware, firmware, and/or a processor or microprocessor. In other embodiments, the method may be implemented using an application specific integrated circuit, a field-programmable gate array, other hardware circuitry, integrated circuits, software, firmware, and/or a combination thereof. As illustrated, an S-Matrix may be determined that includes field amplitudes for each of a plurality of lumped ports, N, associated with a wireless power transfer device, at 1505.

The N lumped ports may include a plurality of lumped antenna ports, $N_a$, wherein each lumped antenna port corresponds to an impedance value of a lumped impedance element in communication with at least one sub-wavelength antenna element of an antenna device, wherein the impedance value of each of the lumped impedance elements is variable based on one or more impedance control inputs, and at least one lumped external port, $N_e$, located physically external to the antenna device. If multiple receivers are used in the wireless power transfer system then multiple spatially separated lumped external ports, $N_e$, may be used. In various embodiments, the S-Matrix may be expressible in terms of an impedance matrix, Z-Matrix, with impedance values, $z_n$, of each of the plurality of lumped ports, N.

Once the S-Matrix has been determined, a target radiation pattern of the antenna device may be defined in terms of target field amplitudes in the S-Matrix for the at least one lumped external port, $N_e$, at 1510. For multiple receivers, the target radiation pattern may include one or more bifurcations of the transmitted beam (as illustrated in FIG. 13A. An optimized port impedance vector, $\{z_n\}$, of impedance values for each of the lumped antenna ports, $N_a$, may then be determined, at 1515, that results in an S-Matrix element for the at least one lumped external port, $N_e$, that approximates the target field amplitude(s) for an operating frequency or operating frequency range.

Many existing computing devices and infrastructures may be used in combination with the presently described systems and methods. Some of the infrastructure that can be used with embodiments disclosed herein is already available, such as general-purpose computers, computer programming tools and techniques, digital storage media, and communication links. A computing device or controller may include a processor, such as a microprocessor, a microcontroller, logic circuitry, or the like.

A processor may include a special purpose processing device, such as application-specific integrated circuits (ASIC), programmable array logic (PAL), programmable logic array (PLA), programmable logic device (PLD), field programmable gate array (FPGA), or other customizable and/or programmable device. The computing device may also include a machine-readable storage device, such as non-volatile memory, static RAM, dynamic RAM, ROM, CD-ROM, disk, tape, magnetic, optical, flash memory, or other machine-readable storage medium. Various aspects of certain embodiments may be implemented using hardware, software, firmware, or a combination thereof.

The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In many instances, well-known structures, materials, or operations are not shown or described in detail to avoid obscuring aspects of this disclosure.

The embodiments of the systems and methods provided within this disclosure are not intended to limit the scope of the disclosure, but are merely representative of possible embodiments. In addition, the steps of a method do not necessarily need to be executed in any specific order, or even sequentially, nor do the steps need to be executed only once. As described above, descriptions and variations described in terms of transmitters are equally applicable to receivers, and vice versa.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims.

What is claimed is:

1. A wireless power transmitter, comprising:
    a plurality of sub-wavelength antenna elements configured to scatter received electromagnetic fields;
    a plurality of lumped impedance elements in communication with the plurality of sub-wavelength antenna elements;
    a plurality of variable impedance control inputs configured to allow for the selection of an impedance value for each of the lumped impedance elements;
    a computer-readable medium providing instructions accessible to a processor to cause the processor to perform operations for radiation patterning, comprising:
        determining a scattering matrix (S-Matrix) of electromagnetic field amplitudes for each of a plurality of lumped ports, wherein the lumped ports include:
            a plurality of lumped antenna ports with impedance values corresponding to the impedance values of each of the plurality of lumped impedance elements; and
            at least one lumped external port corresponding to a wireless power receiver located physically external to the wireless power transmitter,
            wherein the S-Matrix is expressible in terms of an impedance matrix, Z-Matrix, with impedance values of each of the plurality of lumped ports;
        identifying a target electromagnetic radiation pattern of the wireless power transmitter defined in terms of target electromagnetic field amplitudes in the S-Matrix for the at least one lumped external port;
        determining an optimized port impedance vector $\{z_n\}$ of impedance values for each of the lumped antenna ports that results in an S-Matrix element for the at least one lumped external port that approximates the target electromagnetic field amplitude for an operating frequency; and
        adjusting at least one of the plurality of variable impedance control inputs to modify at least one of the impedance values of at least one of the plurality of variable lumped impedance elements based on the determined optimized $\{z_n\}$ of the impedance values for the lumped antenna ports.

2. The transmitter of claim 1, wherein the plurality of sub-wavelength antenna elements is divided into at least two groups, wherein sub-wavelength antenna elements within each group are separated from one another by no more than half of an operating wavelength, and wherein each group of sub-wavelength antenna elements is spatially separated from each other group of sub-wavelength antenna elements by at least a distance exceeding that of half of an operating wavelength.

3. The transmitter of claim 2, wherein the at least two groups of sub-wavelength antenna elements comprises a first group of sub-wavelength antenna elements that is not co-planar with a second group of sub-wavelength antenna elements.

4. The transmitter of claim 3, wherein the target electromagnetic radiation pattern is selected to optimize a power transfer from the first group of sub-wavelength antenna elements to the second group of sub-wavelength antenna elements.

5. The transmitter of claim 4, wherein optimizing the power transfer comprises maintaining the power transferred to another lumped external port below a threshold level.

6. The transmitter of claim 5, wherein maintaining below the threshold level is a maintaining below a predetermined threshold to avoid overexposing objects, equipment, or living things.

7. The transmitter of claim 5, wherein maintaining below the threshold is a specific limiting of power density within a dynamic exclusion zone.

8. The transmitter of claim 1, wherein the impedance control input associated with at least one of the lumped impedance elements comprises a direct current (DC) voltage input, wherein the impedance value of the at least one lumped impedance element is based on the magnitude of the voltage supplied via the DC voltage input.

9. The transmitter of claim 1, wherein the impedance control input associated with at least one of the lumped impedance elements can be varied to adjust the impedance value of the at least one lumped impedance element, wherein the impedance control input comprises one of: an electrical current input, a radiofrequency electromagnetic wave input, an optical radiation input, a thermal radiation input, a terahertz radiation input, an acoustic wave input, a phonon wave input, a thermal conduction input, a mechanical pressure input and a mechanical contact input.

10. The transmitter of claim 1, wherein each of the lumped impedance elements is modeled as an encapsulated two-port structure connected to the terminals of a lumped port.

11. The transmitter of claim 1, wherein at least one of the lumped impedance elements comprises at least one of a split ring resonator, an ELC resonator, a spiral resonator, a complementary split ring resonator, and a complementary ELC resonator.

12. The transmitter of claim 1, wherein at least one of the lumped impedance elements is connected to and collocated with a tunable microelectronic circuit.

13. The transmitter of claim 1, wherein at least some of the lumped impedance elements are connected to and collocated with tunable microelectronic circuits addressable using a row and column addressing scheme.

14. The transmitter of claim 1, wherein at least one of the lumped impedance elements is connected to and collocated with a tunable microelectronic circuit located at the intersection of a word line and a bit line, and connected to both the word line and the bit line.

15. The transmitter of claim 1, wherein the lumped impedance elements form a concentric-circular array with elements aligned along radial lines from a common center.

16. The transmitter of claim 1, wherein the at least one lumped external port comprises a plurality of lumped external ports all located external to the wireless power transmitter, and wherein the target electromagnetic field amplitudes in the S-Matrix of each of the plurality of lumped external ports correspond to a target electromagnetic radiation pattern of the wireless power transmitter for at least the operating frequency.

17. The transmitter of claim 16, wherein each of the sub-wavelength antenna elements comprises an antenna element with a maximum dimension that is less than half of a wavelength of the smallest frequency in an operating frequency range.

18. The transmitter of claim 16, wherein the at least one lumped external port comprises a virtual external port.

19. The transmitter of claim 16, wherein the at least one lumped external port comprises a receiving antenna associated with the wireless power receiver.

20. The transmitter of claim 1, wherein determining the optimized $\{z_n\}$ comprises calculating the optimized $\{z_n\}$ by optimizing the values of impedance control inputs that are related to the impedance values for each of the lumped antenna ports through at least one nonlinear function.

21. The transmitter of claim 1, wherein identifying the target electromagnetic radiation pattern of the wireless power transmitter in terms of the target electromagnetic field amplitude in the S-Matrix for the at least one lumped external port comprises:
   identifying the target electromagnetic radiation pattern of the wireless power transmitter in terms of a target field amplitude for a single linear field polarization.

22. The transmitter of claim 1, wherein the at least one lumped external port comprises a plurality of lumped external ports all located external to the wireless power transmitter, and
   wherein identifying the target electromagnetic radiation pattern of the wireless power transmitter in terms of the target field amplitude in the S-Matrix for the plurality of lumped external ports comprises:
   identifying the target electromagnetic radiation pattern of the wireless power transmitter in terms of a target field amplitude for at least two linear polarizations.

23. The transmitter of claim 1, wherein determining the optimized $\{z_n\}$ of impedance values for each of the lumped antenna ports comprises determining an optimized set of control values for the plurality of impedance control inputs that results in an field amplitude for the at least one lumped external port in the S-Matrix that approximates the target field amplitude for an operating frequency.

24. A method for wireless power radiation patterning, comprising:
   determining a scattering matrix (S-Matrix) of field amplitudes for each of a plurality of lumped ports associated with a wireless power transmitter, including
      a plurality of lumped antenna ports wherein each lumped antenna port corresponds to an impedance value of a lumped impedance element in communication with at least one sub-wavelength antenna element of the wireless power transmitter,
      wherein the at least one sub-wavelength antenna element is configured to scatter received electromagnetic fields, and
      at least one lumped external port located physically external to the wireless power transmitter,
   wherein the S-Matrix is expressible in terms of an impedance matrix, Z-Matrix, with impedance values of each of the plurality of lumped ports;

identifying a target electromagnetic radiation pattern of the wireless power transmitter defined in terms of target field amplitudes in the S-Matrix for the at least one lumped external port; and determining an optimized port impedance vector, $\{z_n\}$, of impedance values for each of the lumped antenna ports that results in an S-Matrix element for the at least one lumped external port that approximates the target field amplitude for an operating frequency.

25. The method of claim 24, further comprising generating the electromagnetic fields received by the plurality of sub-wavelength antenna elements via a source external to the wireless power transmitter.

26. The method of claim 24, further comprising generating the electromagnetic fields received by the plurality of sub-wavelength antenna elements via at least one location on a transmission line.

27. The method of claim 24, further comprising generating the electromagnetic fields received by the plurality of sub-wavelength antenna elements via a transmission line selected from the group comprising a rectangular waveguide, a parallel-plate waveguide, a microstrip line, and a coaxial line.

28. The method of claim 24, further comprising generating the electromagnetic fields received by the plurality of sub-wavelength antenna elements are generated by at least one of a short dipole antenna, a resonant dipole antenna, a loop antenna, a resonant loop antenna, a spiral antenna, a half-wavelength dipole antenna, a patch antenna, a horn antenna, and a dish antenna.

29. The transmitter of claim 28, wherein at least one element of the plurality of sub-wavelength elements is within the reactive near-field of the antenna generating electromagnetic fields.

30. The method of claim 24, wherein the impedance value of each of the lumped impedance elements is variable based on one or more impedance control inputs.

31. The method of claim 24, wherein each lumped impedance element is associated with a unique dielectric loading, such that the impedance value of each lumped impedance element is independently selectable.

32. The method of claim 24, wherein the at least one lumped external port comprises a cell within a battery.

33. The method of claim 24, wherein the at least one lumped external port is connected to an input port of a rectifying circuit.

34. The method of claim 33, wherein the at least one lumped external port comprises a wireless power receiver associated with a personal electronic device.

35. The method of claim 24, wherein the at least one lumped external port comprises a wireless power receiver associated with a medical implant.

36. The method of claim 24, wherein the at least one lumped external port comprises a wireless power receiver associated with a medical device residing temporarily inside a patient.

37. The method of claim 24, wherein the at least one lumped external port comprises a wireless power receiver associated with a medical device passing through a lumen of a patient.

38. The method of claim 24, wherein the at least one lumped external port comprises a wireless power receiver associated with a medical implant.

* * * * *